(12) United States Patent
Deshpande et al.

(10) Patent No.: US 8,626,162 B2
(45) Date of Patent: Jan. 7, 2014

(54) REGISTRATION AND ACCESS CONTROL IN FEMTO CELL DEPLOYMENTS

(75) Inventors: Manoj M. Deshpande, San Diego, CA (US); Francesco Pica, San Diego, CA (US); Gavin B. Horn, La Jolla, CA (US); Jen M. Chen, San Diego, CA (US); Osok Song, San Diego, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 12/478,494

(22) Filed: Jun. 4, 2009

(65) Prior Publication Data

US 2009/0305699 A1  Dec. 10, 2009

Related U.S. Application Data

(60) Provisional application No. 61/059,680, filed on Jun. 6, 2008.

(51) Int. Cl.
*H04W 4/00* (2009.01)

(52) U.S. Cl.
USPC ..... 455/435.1; 455/434; 455/525; 455/67.11; 370/338; 370/329

(58) Field of Classification Search
USPC ........... 455/411, 434, 435.1, 437, 422.1, 458, 455/525, 67.11; 370/328, 252, 329, 338; 345/420; 430/313; 257/E21.314
See application file for complete search history.

(56) References Cited

U.S. PATENT DOCUMENTS

| 7,742,760 B2* | 6/2010 | Patzer et al. | 455/419 |
| 8,005,479 B2* | 8/2011 | Meiyappan | 455/450 |
| 2007/0121590 A1* | 5/2007 | Turner et al. | 370/352 |
| 2007/0197234 A1* | 8/2007 | Gill et al. | 455/458 |
| 2008/0220782 A1* | 9/2008 | Wang et al. | 455/436 |

(Continued)

FOREIGN PATENT DOCUMENTS

| JP | 2000514267 A | 10/2000 |
| JP | 2009111624 A | 5/2009 |

(Continued)

OTHER PUBLICATIONS

Asustek, 3GPP TSG-RAN WG2 #59 bis, R2-073941, Oct. 8, 2007, all pages.*

(Continued)

*Primary Examiner* — Mahendra Patel
(74) *Attorney, Agent, or Firm* — Ashish L. Patel

(57) ABSTRACT

Systems and methodologies are described that facilitate distributing and/or utilizing a Closed Subscriber Group (CSG) Identifier (ID) that identifies a CSG corresponding to a base station and a CSG indication that distinguishes between the base station permitting access to members of the CSG and permitting access to members and non-members of the CSG. For instance, the CSG ID can uniquely identify the CSG corresponding to the base station. A mobile device can receive the CSG ID and the CSG indication from the base station. Further, the received CSG ID can be compared to CSG IDs included in an allowed CSG list to recognize whether the mobile device is a member or a non-member of the CSG. Moreover, a preference for selecting the base station as compared to a disparate base station can be generated as a function of the received CSG ID and CSG indication.

26 Claims, 13 Drawing Sheets

(56) References Cited

U.S. PATENT DOCUMENTS

| | | | |
|---|---|---|---|
| 2008/0227447 A1* | 9/2008 | Jeong et al. | 455/434 |
| 2008/0267153 A1* | 10/2008 | Mukherjee et al. | 370/338 |
| 2009/0070694 A1* | 3/2009 | Ore et al. | 715/764 |
| 2009/0270092 A1* | 10/2009 | Buckley et al. | 455/434 |
| 2010/0240397 A1* | 9/2010 | Buchmayer et al. | 455/456.1 |
| 2010/0265867 A1* | 10/2010 | Becker et al. | 370/312 |
| 2010/0273448 A1 | 10/2010 | Iwamura et al. | |
| 2010/0323663 A1* | 12/2010 | Vikberg et al. | 455/410 |

FOREIGN PATENT DOCUMENTS

| | | |
|---|---|---|
| JP | 2009260895 A * | 11/2009 |
| JP | 2011509600 A | 3/2011 |
| JP | 4773565 B2 | 9/2011 |
| RU | 2287220 C2 | 11/2006 |
| RU | 2291591 C2 | 1/2007 |
| WO | 2009057602 A1 | 5/2009 |

OTHER PUBLICATIONS

NTT DoCoMo, 3GPP TSG RAN WG2 #60, R2-075150, Nov. 5, 2007, all pages.*

Asustek: "CSG operation handling in IDLE mode" SGPP Draft; R2-073941 CSG Operation Handling in IDLE Mode, 3RD Generation Partnership Project (SGPP), Mobile Competence Centre ; 650, Route Des Lucioles ; F-06921 Sophia-Antipolis Cedex ; France, vol. RAN WG2, No. Shanghai, China; 20071002, Oct. 2, 2007, XP050136586 [retrieved on Oct. 2, 2007] p. 1, paragraph 1.

International Search Report & Written Opinion—PCT/US2009/046520, International Search Authority—European Patent Office—Feb. 10, 2009.

Motorola: "Identification and Measurement of CSG cells"—SGPP Draft; R2-081114, 3rd Generation Partnership Project (SGPP), Mobile Competence Centre ; 650, Route Des Lucioles ; F-06921 Sophia-Antipolis Cedex ; France, vol. RAN WG2, No. Sorrento, Italy; 20080205, Feb. 5, 2008, XP050138898 [retrieved on Feb. 5, 2008] the whole document.

NTT Docomo et al: "Clarification of Home eNB scenarios and issues for RAN2/3/4" SGPP Draft; R2-075151 Clarification of Home Enb, 3rd Generation Partnership Project (SGPP), Mobile Competence Centre ; 650, Route Des Lucioles ; F-06921 Sophia-Antipolis Cedex ; France, vol. RAN WG2, No. Jeju; 20071112, Nov. 12, 2007, XP050137598 [retrieved on Nov. 12, 2007] pp. 1-2, paragraphs 2,3.1 p. 3, paragraph 4.

NTT Docomo et al: "CSG with limited open access" 3GPP Draft; R2-075150 CSG With Limited Open Access, 3rd Generation Partnership Project (3GPP), Mobile Competence Centre ; 650, Route Des Lucioles ; F-06921 Sophia—Antipolis Cedex ; France, vol. RAN WG2, No. Jeju; 20071112, Nov. 12, 2007, XP050137597 [retrieved on Nov. 12, 2007] the whole document.

Vodafone Group: "Signalling on a CSG Cell" SGPP Draft; R2-072831, 3rd Generation Partnership Project (3GPP), Mobile Competence Centre ; 650, Route Des Lucioles ; F-06921 Sophia-Antipolis Cedex ; France, vol. RAN WG2, No. Orlando, USA; 20070702, Jul. 2, 200.

European Search Report—EP11173744—Search Authority—Munich—Aug. 29, 2011.

Vodafone, Telecom Italia : "Mobility Management Identifiers in EPS Entities",C1-071669,3GPP TSG CT WG1 Meeting #48,Aug. 24, 2007.

* cited by examiner

REGISTRATION AND ACCESS CONTROL IN FEMTO CELL DEPLOYMENTS

CLAIM OF PRIORITY UNDER 35 U.S.C. §119

The present Application for Patent claims priority to Provisional Application No. 61/059,680 entitled "SYSTEMS AND METHODS FOR REGISTRATION AND ACCESS CONTROL IN FEMTOCELL DEPLOYMENTS" filed Jun. 6, 2008, and assigned to the assignee hereof and hereby expressly incorporated by reference herein.

BACKGROUND

1. Field

The following description relates generally to wireless communications, and more particularly to advertising and utilizing Closed Subscriber Group (CSG) Identifiers (IDs) that signify corresponding CSGs of base stations and CSG indications that specify whether the base stations allow access to members of respective CSGs or members and non-members of respective CSGs in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to mobile devices using a wireless technology (e.g., 3GPP Universal Mobile Telecommunications System (UMTS) or Long Term Evolution (LTE), 1× Evolution-Data Optimized (1×EV-DO), . . . ) to communicate with the mobile devices and an existing broadband Internet connection (e.g., digital subscriber line (DSL), cable, . . . ) for backhaul. A femto cell base station can also be referred to as a Home Evolved Node B (HeNB), a Home Node B (HNB), a femto cell, or the like. Examples of other types of base stations include pico cell base stations, micro cell base stations, and so forth.

Mobile devices are typically able to detect presence of one or more proximate base stations of various types (e.g., macro cell, micro cell, femto cell, pico cell, . . . ). Moreover, a particular base station can be selected to be accessed by a given mobile device. However, when the given mobile device is within vicinity of two or more base stations, conventional techniques oftentimes fail to enable the given mobile device to effectively identify which base station to prefer for selection (e.g., to camp on, register with, access, . . . ). Conventional selection approaches can be detrimentally impacted by some base stations permitting access by substantially any mobile device and disparate base stations allowing access by authorized mobile device(s) to the exclusion of unauthorized mobile device(s). Moreover, common selection techniques can be problematic when preferential billing arrangements are leveraged where certain base stations permit access by substantially any mobile device, while a subset of these mobile devices are preferentially billed as compared to other mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with distributing and/or utilizing a Closed Subscriber Group (CSG) Identifier (ID) that identifies a CSG corresponding to a base station and a CSG indication that distinguishes between the base station permitting access to members of the CSG and permitting access to members and non-members of the CSG. For instance, the CSG ID can uniquely identify the CSG corresponding to the base station. A mobile device can receive the CSG ID and the CSG indication from the base station. Further, the received CSG ID can be compared to CSG IDs included in an allowed CSG list to recognize whether the mobile device is a member or a non-member of the CSG. Moreover, a preference for selecting the base station as compared to a disparate base station can be generated as a function of the received CSG ID and CSG indication.

According to related aspects, a method is described herein. The method can include receiving an advertised Closed Subscriber Group (CSG) Identifier (ID) that identifies a CSG corresponding to a base station. Further, the method can include receiving an advertised Closed Subscriber Group (CSG) Identifier (ID) that identifies a CSG corresponding to a base station. Moreover, the method can comprise identifying whether the advertised CSG ID matches one or more CSG IDs included in an allowed CSG list. The method can also include generating a preference for selecting the base station as compared to a disparate base station when the advertised CSG indication specifies that the base station permits access to the members and the non-members of the CSG and the advertised CSG ID matches at least one of the one or more CSG IDs included in the allowed CSG list.

Another aspect relates to a wireless communications apparatus. The wireless communications apparatus can include at least one processor. The at least one processor can be configured to compare a received Closed Subscriber Group (CSG) Identifier (ID), which identifies a CSG associated with a base station, to one or more CSG IDs included in an allowed CSG list to recognize existence of a match. Moreover, the at least one processor can be configured to generate a preference for selecting the base station as compared to a disparate base station when a received CSG indication signifies that the base station permits services to both members and non-members of the CSG and the received CSG ID matches at least one of the one or more CSG IDs included in the allowed CSG list.

Yet another aspect relates to a wireless communications apparatus. The wireless communications apparatus can include means for receiving a Closed Subscriber Group (CSG) Identifier (ID) that corresponds to a CSG pertaining to a base station. Further, the wireless communications apparatus can include means for receiving a CSG indication that differentiates between the base station allowing access to members of the CSG and allowing access to both members and non-members of the CSG.

Still another aspect relates to a computer program product that can comprise a computer-readable medium. The computer-readable medium can include code for causing at least one computer to receive an advertised Closed Subscriber Group (CSG) Identifier (ID) that identifies a CSG corresponding to a base station. The computer-readable medium can further include code for causing at least one computer to receive an advertised CSG indication that distinguishes between the base station permitting access to members of the CSG and permitting access to members and non-members of the CSG. Moreover, the computer-readable medium can include code for causing at least one computer to identify whether the advertised CSG ID matches one or more CSG IDs included in an allowed CSG list. Still yet, the computer-readable medium can include code for causing at least one computer to generate a preference for selecting the base station as compared to a disparate base station when the advertised CSG indication specifies that the base station permits access to the members and the non-members of the CSG and the advertised CSG ID matches at least one of the one or more CSG IDs included in the allowed CSG list.

Yet another aspect relates to an apparatus that can include a receiving component that obtains an advertised Closed Subscriber Group (CSG) Identifier (ID) that identifies a CSG corresponding to a base station and an advertised CSG indication that differentiates between the base station permitting access to members of the CSG and permitting access to members and non-members of the CSG. Moreover, the apparatus can include a comparison component that evaluates whether the advertised CSG ID matches a CSG ID included in an allowed CSG list. The apparatus can further comprise a preference generation component that generates a preference for selecting the base station as compared to a disparate base station when the advertised CSG indication specifies that the base station permits access to the members and the non-members of the CSG and the advertised CSG ID of the base station matches the CSG ID included in the allowed CSG list.

In accordance with other aspects, a method is described herein. The method can include transmitting a Closed Subscriber Group (CSG) Identifier (ID) that identifies a CSG pertaining to a base station. Further, the method can include transmitting a CSG indication that distinguishes between the base station permitting access to members of the CSG and permitting access to the members and non-members of the CSG.

Another aspect relates to a wireless communications apparatus. The wireless communications apparatus can include at least one processor. The at least one processor can be configured to advertise a Closed Subscriber Group (CSG) Identifier (ID) to a mobile device, the CSG ID identifies a CSG associated with a base station. Moreover, the at least one processor can be configured to advertise a CSG indication to the mobile device, the CSG indication distinguishes between the base station permitting access to members of the CSG and permitting access to the members and non-members of the CSG.

Yet another aspect relates to a wireless communications apparatus. The wireless communications apparatus can include means for sending a Closed Subscriber Group (CSG) Identifier (ID), which identifies a CSG associated with a base station, to a mobile device. Moreover, the wireless communications apparatus can include means for sending a CSG indication, which distinguishes between the base station permitting access to members of the CSG and permitting access to the members and non-members of the CSG, to the mobile device.

Still another aspect relates to a computer program product that can comprise a computer-readable medium. The computer-readable medium can include code for causing at least one computer to transmit a Closed Subscriber Group (CSG) Identifier (ID), which identifies a CSG corresponding to a base station, to a mobile device. The computer-readable medium can further include code for causing at least one computer to transmit a CSG indication, which distinguishes between the base station permitting access to members of the CSG and permitting access to the members and non-members of the CSG, to the mobile device.

Yet another aspect relates to an apparatus that can include an identity advertising component that transmits a Closed Subscriber Group (CSG) Identifier (ID) that identifies a CSG corresponding to a base station over a downlink. Moreover, the apparatus can include a mode publicizing component that transmits a CSG indication that distinguishes between the base station permitting access to members of the CSG and permitting access to the members and non-members of the CSG over the downlink.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
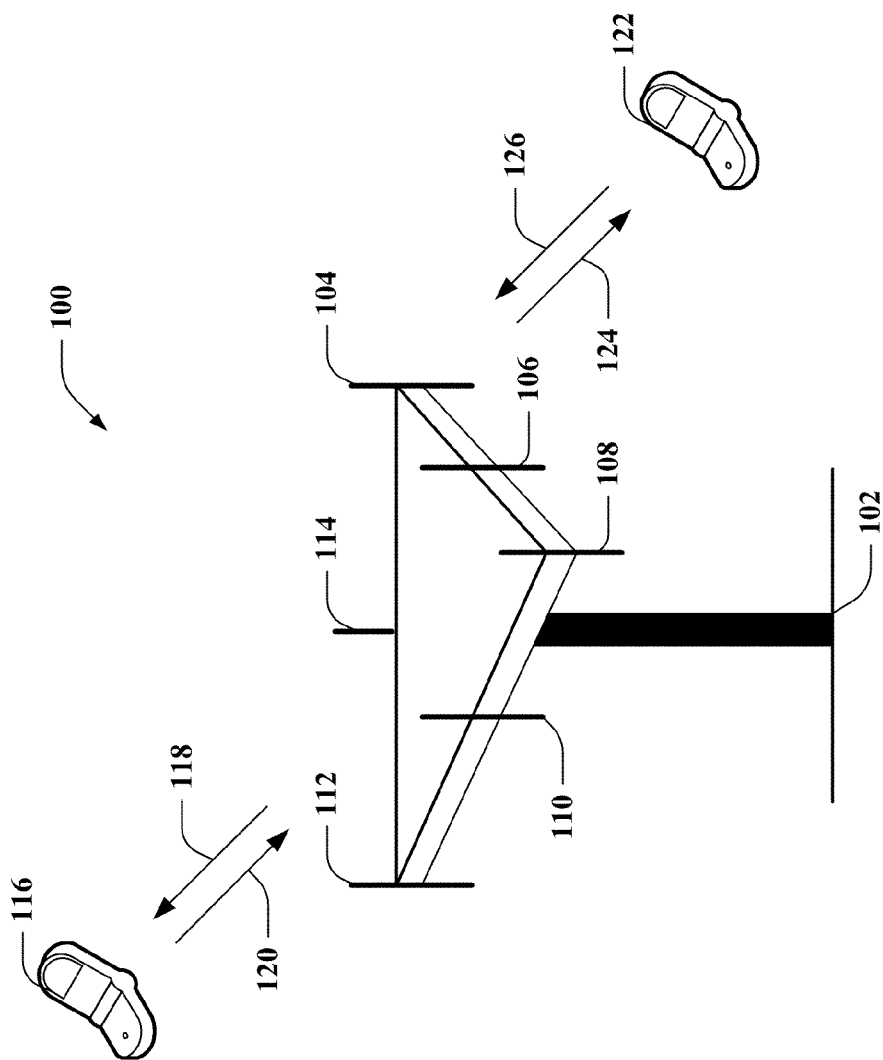
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), a femto cell, a pico cell, a micro cell, a macro cell, a Home Evolved Node B (HeNB), a Home Node B (HNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency.

Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

It is contemplated that base station 102 can be any type of base station (e.g., macro cell base station, micro cell base station, pico cell base station, femto cell base station, . . . ). Each mobile device 116, 122 can generate a preference for selecting a respective target base station (e.g., base station 102, disparate base station (not shown), . . . ). According to an illustration, various access control approaches can be leveraged by mobile devices 116, 122 (e.g. operator controlled approach, user and operator controlled approach, . . . ). Following this illustration and as described herein, base station 102 can broadcast information to aid mobile devices 116, 122 in cell selection. The broadcasted information, for instance, can include a Closed Subscriber Group (CSG) Identifier (ID) (e.g. CSG identity, . . . ) that identifies a Closed Subscriber Group (CSG) associated with base station 102. Moreover, the broadcasted information can include a CSG indication that distinguishes between base station 102 permitting access to only members of the CSG and permitting access to both members and non-members of the CSG. Additionally or alternatively, base station 102 can employ signaling and/or error codes to efficiently handle cell reselection. Further, signaling and/or an application can be utilized to provision respective allowed CSG lists in mobile devices 116, 122.

Base station 102 can be a CSG base station, a hybrid base station, or an open base station. A CSG base station refers to a base station with restricted association accessible by members of a Closed Subscriber Group (CSG) (e.g., non-accessible by non-members of the CSG, . . . ). A CSG base station can also be referred to as a closed base station. A CSG is a set of base stations that share a common access control list of mobile devices. Further, a CSG base station can advertise a corresponding CSG ID, which specifies the CSG corresponding to the CSG base station. An open base station refers to a base station with no restricted association. For instance, an open base station can forgo advertising a CSG ID. Moreover, a hybrid base station can advertise a CSG ID, yet can allow access to both members and non-members of the CSG associated with the CSG ID. For example, a hybrid base station can support preferential billing for members over non-members. According to another example, a hybrid base station can provide priority to members over non-members (e.g. if there is a shortage of resources, then non-members can be dropped prior to members, . . . ). By way of a further example, a hybrid base station can supply a higher level of Quality of Service (QoS) to members versus non-members. It is contemplated, however, that the claimed subject matter is not limited to the aforementioned examples.

A CSG ID is a binary based identifier associated with a subscriber group. The CSG ID can be used to identify a subscriber group (e.g., CSG, . . . ) associated with a CSG base station or a hybrid base station, and can be utilized to support restricted association for a CSG base station. The CSG ID can uniquely identify the CSG associated with the CSG base station or hybrid base station; however, the claimed subject matter is not so limited. Further, the CSG ID associated with a base station typically is not based on an Internet Protocol (IP) address. Further, it is contemplated that more than one base station can share a common CSG ID; however, the claimed subject matter is not so limited. By way of another example, subnets can be used for the CSG ID to enable multiple CSG IDs for an enterprise/hotel while still allowing a single CSG ID for provisioning and the like.

From a perspective of mobile devices 116, 122, a CSG base station (e.g., base station 102, ...) can be a home base station, a guest base station, or an alien base station. A home base station refers to a CSG base station which mobile device 116, 122 is authorized to access. A guest base station refers to a CSG base station which mobile device 116, 122 is temporarily authorized to access. Further, an alien base station refers to a CSG base station which mobile device 116, 122 is not authorized to access.

Moreover, from a standpoint of a CSG base station (e.g. base station 102, ...), each mobile device 116, 122 can be a home mobile device, a guest mobile device or an alien mobile device. A home mobile device refers to a mobile device authorized for access. Moreover, a guest mobile device refers to a mobile device temporarily authorized for access. Further, an alien mobile device refers to a mobile device not authorized for access.

Figure 2:
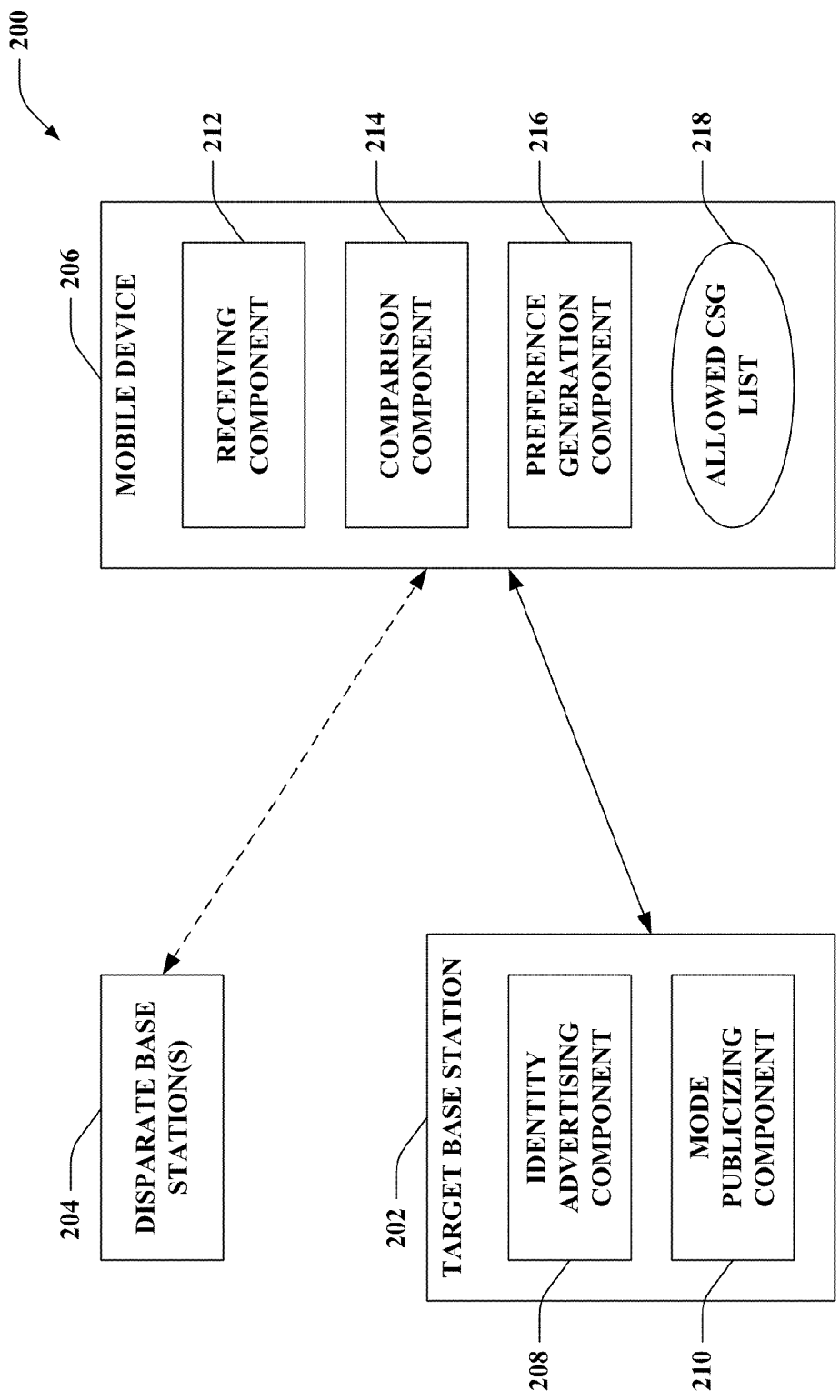
FIG. 2 is an illustration of an example system that supports access control for Closed Subscriber Groups (CSGs) in a wireless communication environment.

Referring to FIG. 2, illustrated is a system 200 that supports access control for Closed Subscriber Groups (CSGs) in a wireless communication environment. System 200 includes a target base station 202 that can transmit and/or receive information, signals, data, instructions, commands, bits, symbols, and the like. Moreover, system 200 can include any number of disparate base station(s) 204, which can be substantially similar to target base station 202. Target base station 202 can communicate with a mobile device 206 via the forward link and/or reverse link. Mobile device 206 can transmit and/or receive information, signals, data, instructions, commands, bits, symbols, and the like. Moreover, although not shown, it is contemplated that any number of mobile devices similar to mobile device 206 can be included in system 200. Further, it is contemplated that target base station 202 and disparate base station(s) 204 can each be any type of base station (e.g., femto cell base station, pico cell base station, micro cell base station, macro cell base station, ...).

According to an example, target base station 202 can be a CSG base station, a hybrid base station, or an open base station. For instance, if target base station 202 is a CSG base station or a hybrid base station, then target base station 202 can be associated with a CSG, and the CSG can be identified by a CSG ID. The CSG can be uniquely identified by the CSG ID, for example. According to another example, the CSG can be uniquely identified by the CSG ID in an operator network. Pursuant to another illustration, disparate base station(s) 204 can include CSG base station(s), hybrid base station(s), and/or open base station(s). Following this illustration, disparate base station(s) 204 that are CSG base station(s) or hybrid base station(s) can be associated with respective CSG(s), and each of the respective CSG(s) can correspond to respective CSG ID(s).

Target base station 202 can further include an identity advertising component 208 and a mode publicizing component 210. Identity advertising component 208 can transmit a Closed Subscriber Group (CSG) Identifier (ID) that identifies a CSG corresponding to target base station 202. Identity advertising component 208 can send the CSG ID over a downlink. The CSG ID transferred over the downlink can be utilized by mobile device 206 to recognize whether it is a member or a non-member of the CSG corresponding to target base station 202. According to an example, an open CSG ID can be defined for an open base station (e.g., if target base station 202 is an open base station, ...), and the open CSG ID can be advertised by identity advertising component 208 (e.g., target base station 202 advertising the open CSG ID can be preferred over disparate base station(s) 204 lacking an advertised open CSG ID, ...); further, every user can be a member of a CSG corresponding to the open CSG ID. By way of another example, a hybrid base station (e.g., if target base station 202 is a hybrid base station, ...) can use an open CSG ID or a unique CSG ID, which can be disseminated by identity advertising component 208. Following this example, every user can be a member of a CSG associated with the open CSG ID, while a subset of users can be a member of a CSG corresponding to the unique CSG ID. It is to be appreciated, however, that the claimed subject matter is not limited to the aforementioned examples.

Moreover, mode publicizing component 210 can transmit a CSG indication over the downlink. The CSG indication can distinguish between target base station 202 being a CSG base station and a hybrid base station. Further, the CSG indication yielded by mode publicizing component 210 can signify whether target base station 202 permits access to only members of the CSG associated with the advertised CSG ID sent by identity advertising component 208 or both members and non-members of the CSG associated with the advertised CSG ID transmitted by identity advertising component 208.

According to an example, a system information block type 1 message (SIB1) for target base station 202 can include informational elements (IEs) related to the CSG ID and the CSG indication (e.g., SIB1 can be yielded by identity advertising component 208 and mode publicizing component 210, ...). The CSG ID (e.g., CSG identity, ...) can be an identity of the CSG within a primary Public Land Mobile Network (PLMN) the cell (e.g., target base station 202, ...) belongs to. The CSG ID IE can be present in a CSG cell. Moreover, the CSG ID IE can be present in a hybrid cell. Further, the CSG indication can be a Boolean value. If the CSG indication is set to true, then a mobile device (e.g., mobile device 206, ...) is only allowed to access the cell if the CSG ID matches an entry in the whitelist (e.g., an allowed CSG list 218 described herein, that the mobile device has stored.

Further, it is contemplated that SIB1 can include another IE (e.g., CSG-included, ...) that indicates whether or not a CSG ID is present; however, the claimed subject matter is not so limited. By way of another example, SIB3 for target base station 202 can include the IEs pertaining to the CSG ID and the CSG indication; yet, the claimed subject matter is not limited to the foregoing example.

According to a further example, it is contemplated that identity advertising component 208 can advertise more than one CSG ID for target base station 202. For instance, a primary CSG ID can be advertised in a system information block type 1 message (SIB1), while secondary CSG IDs for target base station 202 can be included in a new SIBx (e.g., which can be rarely sent, ...). It is to be appreciated, yet, that the claimed subject matter is not limited to the foregoing (e.g., identity advertising component 208 can advertise one CSG ID for target base station 202, ...).

Although not shown, it is further contemplated that disparate base station(s) 204 can include an identity advertising component similar to identity advertising component 208 of target base station 202 and/or a mode publicizing component similar to mode publicizing component 210 of target base station 202.

Mobile device 206 can include a receiving component 212, a comparison component 214, and a preference generation component 216. Receiving component 212 can obtain the advertised CSG ID that identifies the CSG corresponding to target base station 202 and the advertised CSG indication that differentiates between target base station 202 being a CSG base station and hybrid base station. Further, the advertised CSG indication can distinguish between target base station 202 permitting access only to members of the CSG identified by the advertised CSG ID and permitting access to both members and non-members of the CSG identified by the advertised CSG ID. Receiving component 212 can similarly obtain advertised CSG ID(s) and advertised CSG indication(s) from one or more disparate base station(s) 204. It is to be appreciated, however, that one or more of disparate base station(s) 204 can lack an association with a respective CSG; thus, such disparate base station(s) 204 lacking an association with corresponding CSG(s) can forgo advertising respective CSG ID(s) and CSG indication(s).

Comparison component 214 can evaluate whether the advertised CSG ID obtained by receiving component 212 from target base station 202 matches a CSG ID included in an allowed CSG list 218. Moreover, comparison component 214 can analyze whether the advertised CSG ID(s) collected by receiving component 212 from disparate base station(s) 204 match CSG ID(s) included in allowed CSG list 218.

Further, preference generation component 216 can generate a preference for selecting target base station 202 (or one of disparate base station(s) 204) as a function of the advertised CSG ID(s) and advertised CSG indication(s). By way of example, preference generation component 216 can yield the preference for selecting target base station 202 as compared to disparate base station(s) 204 when the advertised CSG indication from target base station 202 specifies that target base station 202 is a hybrid base station (e.g., permits access to both members and non-members of a CSG associated with the advertised CSG ID, . . . ) and the advertised CSG ID of target base station 202 matches the CSG ID included in allowed CSG list 218. Following this example, preference generation component 216 can generate the preference for selecting target base station 202 rather disparate base station(s) 204 that lack an association with respective CSG(s) (e.g., CSG ID(s) fail to be obtained by receiving component 212 from such disparate base station(s) 204 lacking association with respective CSG(s), . . . ). Moreover, pursuant to the foregoing example, preference generation component 216 can yield the preference for choosing target base station 202 in comparison to disparate base station(s) 204 with received CSG ID(s) that lack match(es) in allowed CSG list 218 as recognized by comparison component 214. According to another example, preference generation component 216 can provide the preference to select target base station 202 when the advertised CSG indication obtained from target base station 202 specifies that target base station 202 permits access to members of the CSG (e.g., identified by the advertised CSG ID received from target base station 202, target base station 202 is a CSG base station, . . . ) and the advertised CSG ID matches at least one of the CSG IDs included in allowed CSG list 218. Following the aforementioned example, target base station 202 can be preferred to disparate base station(s) 204 associated with disparate CSG indication(s) which signify that disparate base station(s) 204 permit access to members and non-members of CSG(s) specified by corresponding advertised CSG ID(s) (e.g. a CSG base station can be preferentially chosen over a hybrid base station by preference generation component 216, . . . ). It is to be appreciated, however, that the claimed subject matter is not limited to the aforementioned examples.

According to another illustration, preference generation component 216 can generate the preference for selecting target base station 202 as a function of a billing model. The billing model can include differing billing levels. For instance, home zone billing can be utilized where a preferential billing arrangement is utilized when mobile device 206 connects to a particular base station (e.g., target base station 202, CSG base station, hybrid base station associated with a CSG in which mobile device 206 is a member, . . . ). In accordance with an example, a CSG base station can be preferred to other base stations; hence, mobile device 206 can be preferentially billed when connected to the CSG base station versus other base stations (e.g., open base station, hybrid base station, . . . ). By way of other examples, various billing models can be utilized in connection with open base stations. For example, mobile device 206 can be preferentially billed when connected to any open femto cell base station (e.g., open HeNB, open HNB, . . . ) over other base stations (e.g., macro cell base stations, micro cell base stations, . . . ). Pursuant to a disparate example, no billing preference can be leveraged in connection with any open femto cell base station versus other base stations. According to a further example, a hybrid base station can permit access by both members and non-members of an associated CSG, yet members can receive preferred billing versus non-members.

The preference for selecting target base station 202 yielded by preference generation component 216 can be utilized for various purposes. For instance, mobile device 206 can camp on target base station 202 for idle mode based upon the preference for selecting target base station 202. Moreover, mobile device 206 can register with target base station 202 based upon the preference for selecting target base station 202; accordingly, mobile device 206 can register with target base station 202 to enable receiving pages therefrom. Further, mobile device 206 can access target base station 202 as a function of the preference for selecting target base station 202 (e.g., mobile device 206 can camp on target base station 202 and access target base station 202 thereafter in response to a page or to initiate data transmission, . . . ). It is to be appreciated, however, that the claimed subject matter is not limited to the foregoing illustrations.

To support the aforementioned examples, system 200 can enable differentiating between a macro cell base station and a femto cell base station. Moreover, system 200 can facilitate differentiating between hybrid base stations; thus, mobile device 206 can recognize whether it is a member of a CSG associated with a particular hybrid base station. Further, system 200 can enable prioritizing selection of base stations to access (e.g., preference generation component 216 can prefer to select a CSG base station associated with a CSG in which mobile device 206 is a member versus any hybrid base station, a hybrid base station associated with a CSG in which mobile device 206 is a member versus a hybrid base station associated with a CSG in which mobile device 206 is a non-member, an open femto cell base station versus a macro cell base station, . . . ).

Further, system 200 can employ a mixed deployment of base stations (e.g., target base station 202, disparate base station(s) 204, . . . ) where some base stations are hybrid and other base stations are closed. Moreover, system 200 can support dynamic switching of a base station (e.g., target base station 202, one or more of disparate base station(s) 204, . . . ) between hybrid operation and CSG operation.

Allowed CSG list 218 (e.g., whitelist, . . . ) can be stored in memory (not shown) of mobile device 206. According to another example (not shown), allowed CSG list 218 can be retained upon a Subscriber Identity Module (SIM) or Universal SIM (USIM) associated with mobile device 206. Allowed CSG list 218 can also be retained in a network (e.g., managed by a Home Subscriber Server (HSS) (not shown) along with other subscriber profile information, leveraged by an MME (not shown) to accept or reject access, . . . ) as described herein to enforce access control. Allowed CSG list 218 can be used to manage cell selection preferences, and can include a set of authorized CSG IDs that a subscriber (e.g., associated with mobile device 206, . . . ) is authorized to use. Allowed CSG list 218 can identify base stations (e.g. closed, hybrid, open, . . . ) that a certain user is allowed to access and/or prefers to access (e.g., for access control and/or special billing purposes, . . . ). For instance, allowed CSG list 218 can include a CSG ID of a hybrid base station if mobile device 206 prefers to access a hybrid base station associated with a CSG with which it is a member as compared to a hybrid base station corresponding to a CSG with which it is a non-member. Further, allowed CSG list 218 can comprise a CSG ID of closed base station(s). An ordering of CSG IDs in allowed CSG list 218 can indicate priority (e.g., CSG IDs can be stored in allowed CSG list 218 in priority order, . . . ). Additionally, base stations with an entry in allowed CSG list 218 can be preferred to other base stations not included in allowed CSG list 218.

According to another illustration, allowed CSG list 218 can include CSG ID entries of suitable cells. Allowed CSG list 218 can be created based on CSG IDs provisioned. Pursuant to a further example, it is contemplated that a blacklist can be used to complement allowed CSG list 218 (e.g. blacklist used for roaming, . . . ); however, the claimed subject matter is not so limited.

It is contemplated that allowed CSG list 218 can be operator controlled or operator and user controlled. In the operator controlled approach, an operator can retain control of allowed CSG list 218, and a subscriber can be prohibited from adding or deleting entries in allowed CSG list 218. With a single point of control, the operator controlled approach can offer simplicity in management by mitigating conflicts. Further, with the operator controlled approach, since allowed CSG list 218 can include base stations of interest to mobile device 206, autonomous search procedures to discover base stations need not be specified. In contrast, for the operator and user controlled approach, a subscriber can add and remove entries from allowed CSG list 218. Such user control associated with the operator and user controlled approach can offer flexibility in access control while providing synchronization between allowed CSG list 218 retained by mobile device 206 and the network (e.g., HSS, MME, . . . ).

According to an example, allowed CSG list 218 can be operator controlled (e.g., network controlled, . . . ). Following this example, if mobile device 206 successfully selects a base station (e.g., target base station 202, . . . ) not included in allowed CSG list 218 (e.g., via manual selection, . . . ), then mobile device 206 can refrain from adding the selected base station to allowed CSG list 218. By way of another illustration, if mobile device 206 fails when selecting a base station (e.g., target base station 202, . . . ) included in allowed CSG list 218, then mobile device 206 can refrain from removing the selected base station from allowed CSG list 218 and can start a configurable timer to avoid reselecting such base station. According to a further example, if mobile device 206 includes a signature field for allowed CSG list 218 in a Tracking Area Update (TAU) request and service request, the network can update allowed CSG list 218 if the signature field is out of date. In accordance with another example, a network can page mobile device 206 based on an allowed CSG list corresponding to a last signature received (e.g., last known local copy of allowed CSG list 218 retained by mobile device 206 can be used for paging, . . . ). Following this example, selection of an alien base station by mobile device 206 during idle mode can be mitigated, and the network can page mobile device 206 when a version of the allowed CSG list retained by the network changes (e.g., if a Tracking Area Identifier (TAI) of a base station is in the current TAI list of mobile device 206, . . . ).

By way of another example, allowed CSG list 218 can be operator and user controlled, and hence, mobile device 206 can control allowed CSG list 218. Following this example, if mobile device 206 successfully selects a base station (e.g., target base station 202, . . . ) not included in allowed CSG list 218 (e.g., via manual selection, . . . ), then mobile device 206 can add the selected base station to allowed CSG list 218. By way of another illustration, if mobile device 206 fails when selecting a base station (e.g., target base station 202, . . . ) included in allowed CSG list 218, then mobile device 206 can remove the selected base station from allowed CSG list 218 (e.g., depending upon a reject cause, . . . ). According to a further example, if mobile device 206 includes a signature field for allowed CSG list 218 in a TAU request and service request, then the network can update allowed CSG list 218 if the signature field is out of date and the network can also page mobile device 206 when a version of the allowed CSG list retained by the network changes.

Figure 3:
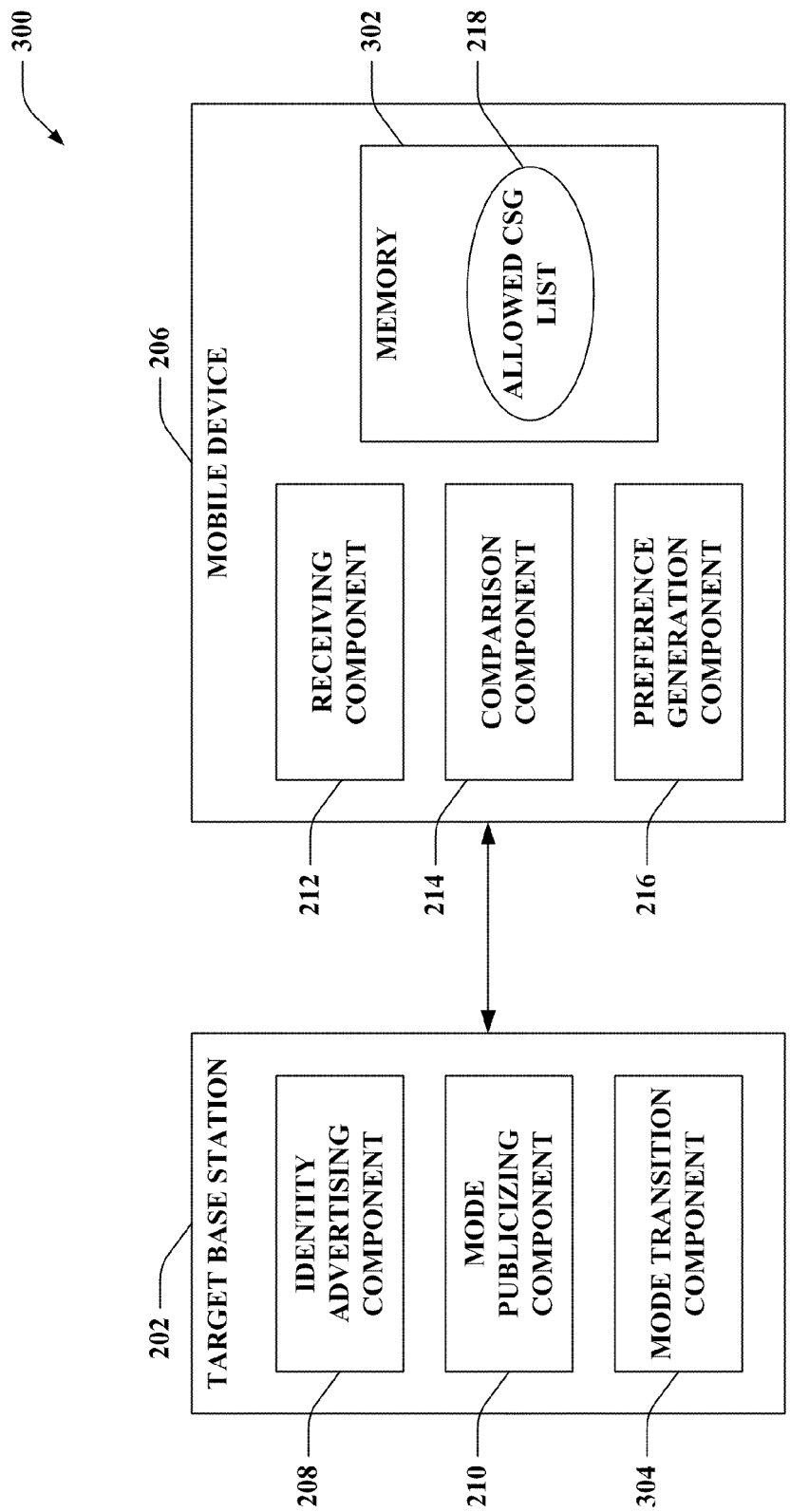
FIG. 3 is an illustration of an example system that utilizes CSGs in connection with access control in a wireless communication environment.

Now referring to FIG. 3, illustrated is a system 300 that utilizes CSGs in connection with access control in a wireless communication environment. System 300 includes target base station 202 and mobile device 206. Target base station 202 include identity advertising component 208, which advertises a CSG ID that identifies a CSG associated with target base station 202 to mobile device 206 (and/or disparate mobile device(s) (not shown)), and mode publicizing component 210, which conveys a CSG indication that distinguishes between target base station 202 permitting access to members of the CSG and permitting access to the members and non-members of the CSG to mobile device 206 (and/or disparate mobile device(s)). For instance, the CSG indication can signify that target base station 202 is a CSG base station when the CSG indication specifies that target base station 202 permits access to members of the CSG (e.g., and target base station 202 is associated with a unique CSG ID disseminated by identity advertising component 208, . . . ). Moreover, the CSG indication can signify that target base station 202 is a hybrid base station when the CSG indication specifies that target base station 202 permits access to both members and non-members of the CSG.

Further, mobile device 206 can include receiving component 212, comparison component 214, and preference generation component 216. Receiving component 212 can acquire the advertised CSG ID and CSG indication from target base station 202. The advertised CSG ID can identify the CSG corresponding to target base station 202. Moreover, the advertised CSG indication can distinguish between target base station 202 permitting access to members of the CSG and permitting access to members and non-members of the CSG. Moreover, comparison component 214 can recognize whether the advertised CSG ID matches one or more CSG IDs included in allowed CSG list 218. Moreover, preference generation component 216 can generate a preference for selecting target base station 202 based upon the advertised CSG ID and advertised CSG indication.

Mobile device 206 can further include memory 302 which can retain allowed CSG list 218. Additionally or alternatively, it is contemplated that allowed CSG list 218 can be stored upon a SIM or a USIM associated with mobile device 206. Memory 302 can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Memory 302 of the subject systems and methods is intended to comprise, without being limited to, these and any other suitable types of memory.

Target base station 202 can further include a mode transition component 304 that switches target base station 202 (e.g., HeNB, HNB, . . . ) between CSG operation and hybrid operation. Accordingly, mode publicizing component 210 can adjust the CSG indication sent over a downlink as a function of the mode employed by target base station 202 as controlled by mode transition component 304. By way of illustration, it is possible that operators can deploy base stations with hybrid access or CSG access as a default, and can permit subscribers to turn access control on or off at a later time. It is thus possible that in a deployment that some base stations are hybrid and some base stations are closed. To support the mixed mode deployment, target base station 202 can include an indication (e.g., CSG indication yielded by mode publicizing component 210, . . . ) of whether it is operating in closed mode or hybrid mode in system information.

According to an illustration, mode transition component 304 can switch target base station 202 from CSG to hybrid operation. While in hybrid mode, the CSG indication can be set to 0 (rather than 1). Further, mode transition component 304 can switch target base station 202 from hybrid to CSG operation, and hence, the CSG indication can be set to 1. It is to be appreciated, however, that the CSG indication can be set to 1 (or some other value) to signify hybrid operation and 0 (or some other value) to specify CSG operation.

Although a hybrid access base station (e.g., target base station 202, . . . ) can provide access to any subscriber, it can provide special home zone billing to base station owners. In order to support the prioritization of a hybrid base station for its owner, a CSG ID can be assigned to the base station. Further, allowed CSG list 218 can include the following: a set of authorized CSG IDs belong to closed base stations that the subscriber is authorized to use; and a set of CSG IDs belong to hybrid base stations that the subscriber prefers due to special billing plans.

Figure 4:
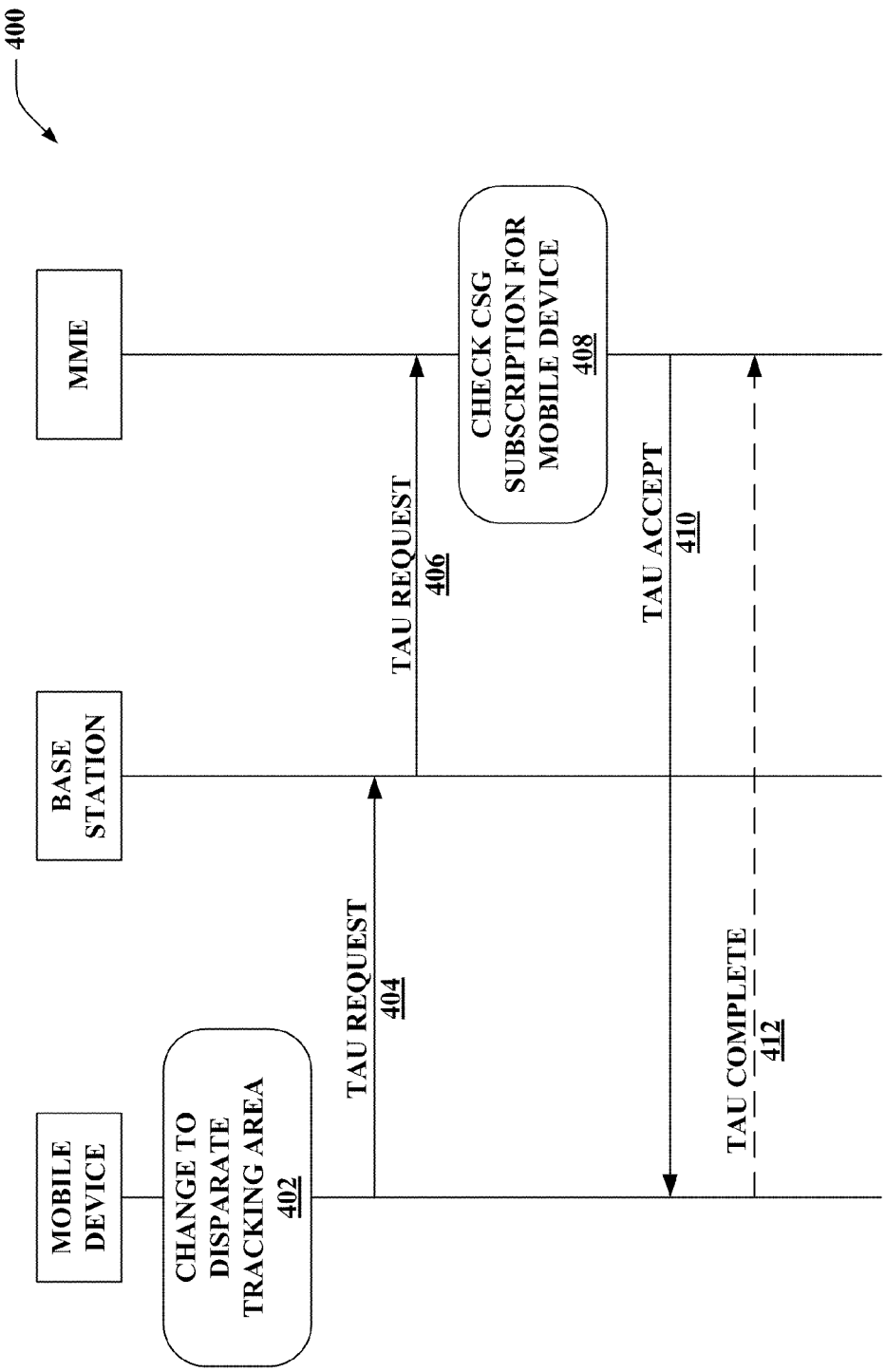
FIG. 4 is an illustration of an example call flow diagram for access control at a CSG cell.

Now turning to FIG. 4, illustrated is an example call flow diagram 400 for access control at a CSG cell. For instance, signaling can be effectuated between a mobile device (e.g., mobile device 206 of FIG. 2, access initiation component 306 of FIG. 3, . . . ), a base station (e.g., target base station 202 of FIG. 2, one of disparate base station(s) 204 of FIG. 2, an HeNB, request forwarding component 308 of FIG. 3, . . . ), and a Mobility Management Entity (MME) as part of a Tracking Area Update (TAU) procedure. At 402, a mobile device can detect a change to a disparate Tracking Area (TA). At 404, the mobile device initiates the TAU procedure by sending a TAU Request message together with an indication of a selected network to the base station. At 406, the base station can derive a MME from a Globally Unique Temporary Identity (GUTI) and from the indicated selected network. Further, the base station can forward the TAU Request message to the MME along with a CSG ID of the base station. At 408, the MME can check whether an allowed CSG list that is included in subscription data of the mobile device included the CSG ID of the base station by utilizing the CSG ID of the serving cell provided with the TAU Request message. If the CSG ID does not match an entry in the allowed CSG list, then the MME rejects the network access initiated by the mobile device (not shown). Alternatively, if the CSG ID matches an entry in the allowed CSG list, the MME can send a TAU Accept message to the mobile device at 410. Further, optionally at 412, if a GUTI or Non-Access Stratum (NAS) security algorithm is included in the TAU Accept message, then the mobile device can acknowledge the received message by returning a TAU Complete message to the MME.

In the case of a rejected tracking area update operation due to the CSG ID of the CSG cell not being in the allowed CSG list of the mobile device as recognized at 408, the MME can return a reject message to the mobile device. The reject message can include a cause value #25 (e.g., CSG not allowed in this Public Land Mobile Network (PLMN), . . . ) and an S1 connection can be released. Further, upon returning to idle, the mobile device can remove the CSG ID of the CSG cell from the allowed CSG list if present.

Referring again to FIG. 3, according to another example, location registration can be effectuated utilizing Location Area Code (LAC)/Routing Area Code (RAC) based registration. To support CSG based access control, each CSG can belong to a unique LAC/RAC. On selection of target base station 202, target base station 202 can perform location registration when target base station 202 belongs to a new LAC. It is to be appreciated, however, that the claimed subject matter is not limited to the aforementioned example.

Various examples are presented below. It is to be appreciated that these examples are for illustration purposes, and the claimed subject matter is not limited to the following examples. Further, many of the below examples relate to generation of a preference, selection and/or access of an HeNB; it is contemplated, however, that these examples can be extended to selection and/or access of other types of base stations (e.g., HNBs, macro cell base stations, micro cell base stations, pico cell base stations, . . . ).

By way of example, mobile device 206 (e.g., a cell selection component (not shown), preference generation component 216, . . . ) can enable selecting (or reselecting) to access target base station 202 manually based upon user input in response to a displayed ranking of detected base stations (e.g., target base station 202 and disparate base station(s) (not shown), . . . ). For instance, the displayed ranking of detected base stations can include an indication of whether each of the detected base station permits access to members of a CSG or permits access to members and non-members of the CSG. Pursuant to an illustration, manual HeNB selection or reselection can be effectuated by mobile device 206. In manual HeNB (re)selection, mobile device 206 can scan and present a list of HeNB Identifiers (HeNB IDs) for detected HeNBs. An HeNB ID (e.g. Home Node B Name, . . . ) is a text based identifier associated with a corresponding CSG ID and used for manual cell selection. Thus, pursuant to an example, a target HeNB (e.g., target base station 202, . . . ) can be associated with a given HeNB ID. Moreover, the HeNB ID can be unique in a manner that a login ID is unique. The HeNB ID can be sent via SIBn and/or can be configured by a user in combination with OAM; however, the claimed subject matter is not so limited. Further, the list displayed by mobile device 206 can be presented in the following order. HeNB IDs of cells whose CSG IDs are included in allowed CSG list 218, if any, can be listed in the same order specified in allowed CSG list 218. If more than one HeNB shares the same CSG ID and if their HNB IDs are identical, then mobile device 206 can display the HeNB with the best radio frequency (RF) quality. Further, if more than one HeNB shares the same CSG ID and if their HeNB IDs differ from each other, then mobile device 206 can display the HeNB IDs belonging to the common CSG in an order of their RF quality (from best to worst). Thereafter, the list can include other HeNB IDs, in order of RF quality (from best to worst), including closed HeNBs that are not present in allowed CSG list 218. Inclusion of other HeNB IDs not included in allowed CSG list 218 allows a user to attempt (re)selection of an HeNB in the event that allowed CSG list 218 stored by mobile device 206 (e.g., in memory 302, . . . ) fails to be synchronized with a version of the allowed CSG list retained in the network. Such desynchronization can result from delay or temporary failure in updating allowed CSG list 218 retained by mobile device 206. Moreover, as part of manual selection, mobile device 206 can indicate whether HeNB is hybrid or closed. Mobile device 206 additionally can display availability of macro coverage and/or relative signal strengths (e.g., signal bars, . . . ) along with the HeNB IDs to aid the user in the selection decision. Upon user selection of an HeNB, mobile device 206 can attempt reselection of the chosen HeNB. Note that depending on channel condition, mobile device 206 may fail to remain on the selected HeNB. After manual selection, automatic (re)selection rules can apply as part of idle mode procedures and can result in (re) selection of a different HeNB. Moreover, if no HeNB is detectable, the manual selection process can end and mobile device 206 can remain on a current cell.

An HeNB can broadcast an HeNB ID in free text format. Mobile device 206 can display the HeNB ID when camping on the cell where it is broadcast. Further, the HeNB ID can be configurable by an administrator of the HeNB. Moreover, the HeNB ID can be associated with the stored CSG IDs.

By way of further example, CSG HeNBs can be identified by a CSG ID for manual selection and provisioning. CSG HeNBs advertising the same CSG ID can have different HeNB IDs. Further, the HeNB ID need not be heard by mobile device 206 for restricted association. Rather, the HeNB ID typically is used for display purposes and manual selection. Moreover, the HeNB ID can be sent out very rarely (e.g., order of seconds, . . . ). Such example can yield advantages related to not needing to hear the HeNB ID to decide to handover in idle or connected state. However, the aforementioned example can result in difficulty associated with provisioning a number manually. Moreover, CSG IDs can be unable to be used to support registration for an enterprise model.

According to another example, automatic base station selection (or reselection) can be effectuated by mobile device 206 (e.g., a cell selection component (not shown), preference generation component 216, . . . ). For instance, mobile device 206 can perform automatic HeNB selection or reselection; however, the claimed subject matter is not so limited. In automatic HeNB (re)selection, mobile device 206 can effectuate the following. HeNBs (e.g., identified by an HeNB indicator in SIB11 transmitted by a serving cell, . . . ) can be discovered, and CSG indicators and CSG IDs corresponding to the detected HeNBs can be recognized. The HeNB indicator can differentiate HeNBs from macro eNBs in a neighbor list, and can be set for an entire carrier frequency dedicated for HeNB deployment. Upon recognition of the CSG indicators and the CSG IDs pertaining to the detected HeNBs, measured cells can be ranked. Further, closed HeNBs not in allowed CSG list 218 can be removed from the ranking without restricting their frequencies of operation. Moreover, a highest ranked cell can be reselected.

Figure 5:
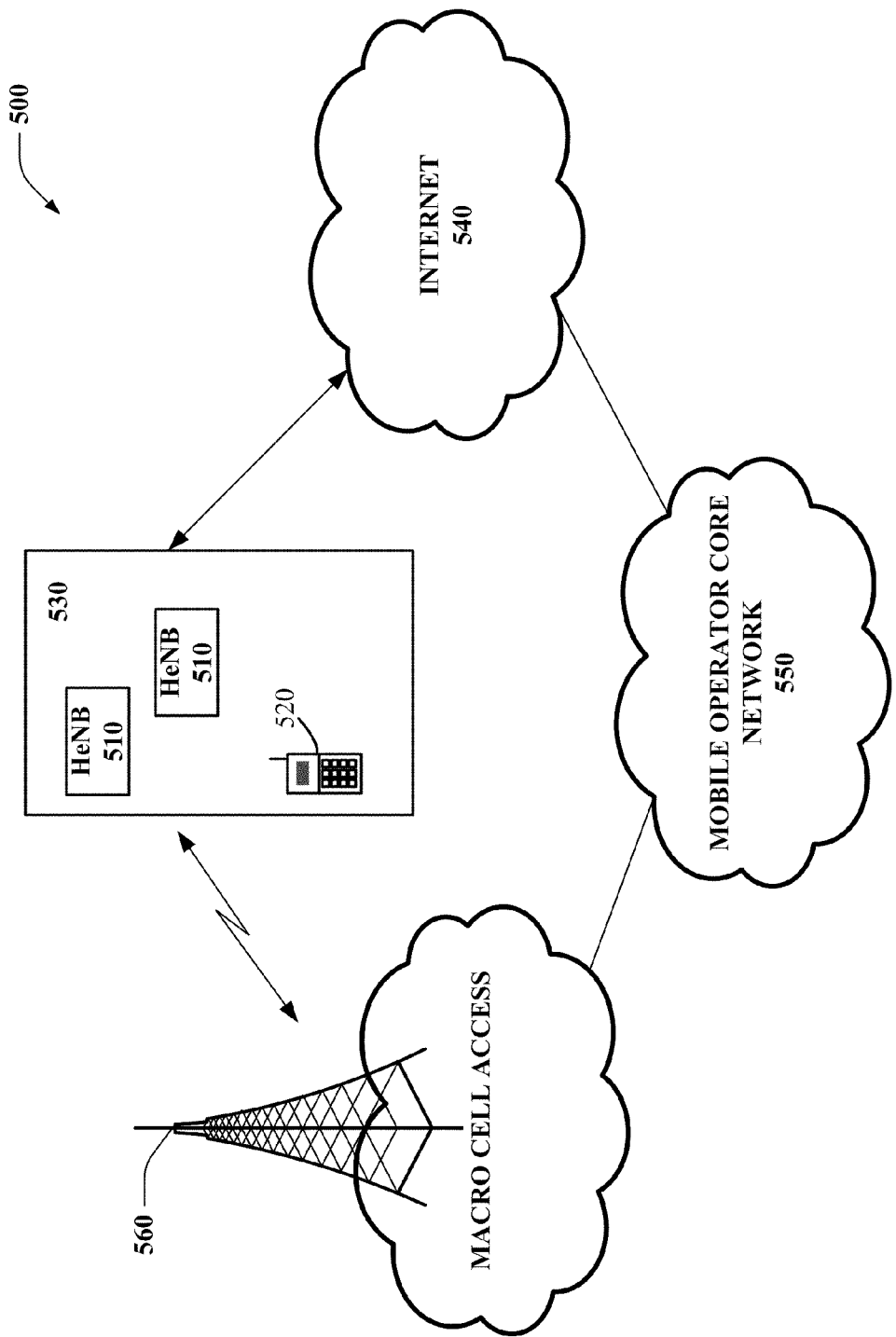
FIG. 5 is an illustration of an example system that enables deployment of access point base stations (e.g. femto cell base stations, . . . ) within a network environment.

FIG. 5 illustrates an exemplary communication system 500 that enables deployment of access point base stations (e.g. femto cell base stations, . . . ) within a network environment. As shown in FIG. 5, system 500 includes multiple femto cell base stations, which can also be referred to as access point base stations, Home Evolved Node B units (HeNBs), Home Node B unit (HNB), femto cells, or the like. The femto cell base stations (HeNBs 510), for example, can each be installed in a corresponding small scale network environment, such as, for example, in one or more user residences 530, and can each be configured to serve associated, as well as alien, mobile device(s) 520. Each HeNB 510 is further coupled to the Internet 540 and a mobile operator core network 550 via a DSL router (not shown) or, alternatively, a cable modem (not shown).

Although embodiments described herein use 3GPP terminology, it is to be understood that the embodiments may be applied to 3GPP (Re199, Re15, Re16, Re17) technology, as well as 3GPP2 (1×RTT, 1×EV-DO Re10, RevA, RevB) technology and other known and related technologies. In such embodiments described herein, the owner of HeNB 510 can subscribe to mobile service, such as, for example, 3G mobile service, offered through the mobile operator core network 550, and mobile device 520 can be capable to operate both in a macro cellular environment via a macro cell base station 560 and in a residential small scale network environment. Thus, HeNB 510 can be backward compatible with any existing mobile device 520.

It is contemplated that HeNBs 510 can include CSG HeNB(s), hybrid HeNB(s), and/or open HeNB(s). HeNBs 510 can each advertise a respective CSG ID and CSG indication; however, it is contemplated that an open HeNB need not disseminate an associated CSG ID and CSG indication (e.g., since the open HeNB can lack an association with a CSG, . . . ). Moreover, mobile device 520 can receive the advertised CSG IDs and CSG indications. For instance, mobile device 520 can compare the received CSG IDs with CSG IDs included in an allowed CSG list associated therewith. When a received CSG ID matches a CSG ID included in the allowed CSG list, mobile device 520 is recognized to be a member of a CSG identified by the matching CSG ID. Further, mobile device 520 can determine whether an HeNB 510 is a CSG HeNB or a hybrid HeNB based upon the CSG indication. Moreover, mobile device 520 can generate a preference for selecting one of HeNB 510 as compared to a disparate base stations (e.g., other HeNBs 510, macro cell base station 560, . . . ) as a function of the received CSG ID and received CSG indication.

Figure 6:
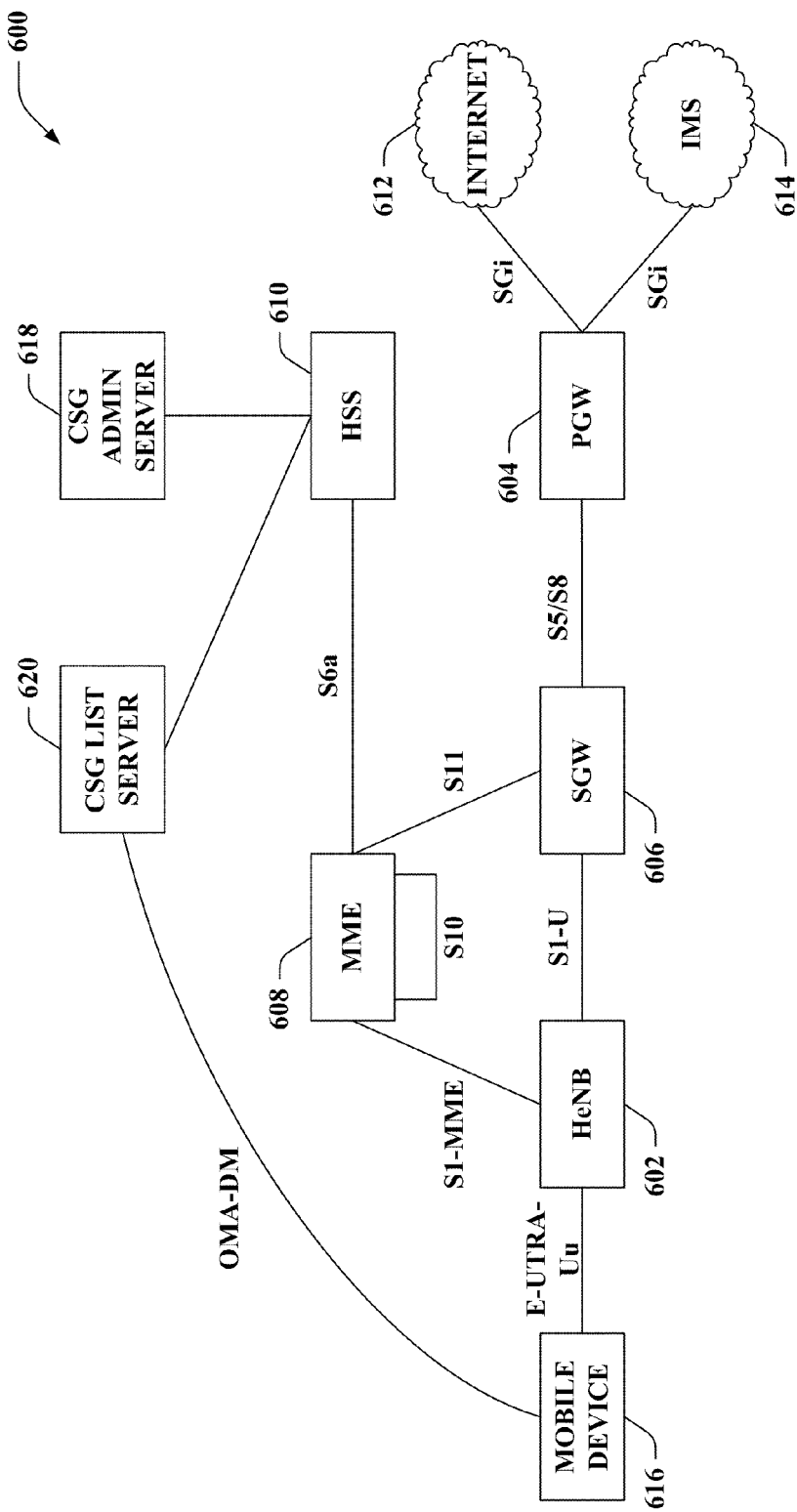
FIG. 6 is an illustration of an example system that provides Closed Subscriber Group (CSG) support in a wireless communication environment.

Now referring to FIG. 6, illustrated is an example system 600 that provides Closed Subscriber Group (CSG) support in a wireless communication environment. System 600 depicts an example architecture model that can be utilized in conjunction with an HeNB 602 (e.g., HeNBs 510 of FIG. 5, target base station 202 of FIG. 2, disparate base station(s) 204 of FIG. 2, . . . ). It is contemplated, however, that disparate architecture models are intended to fall within the scope of the hereto appended claims. For instance, although not shown, it is contemplated that differing architectures that support utilization of CSGs with a HNB, a macro cell base station, or any other type of base station is intended to fall within the scope of the claimed subject matter.

According to an illustration, HeNB 602 can be located on a user's premises; however, the claimed subject matter is not so limited. HeNB 602 can provide Evolved Universal Terrestrial Radio Access Network (E-UTRAN) eNB functions as well as functions to support HeNB authentication, HeNB registration, and HeNB configuration through Operation and Maintenance (OAM).

HeNB 602 can communicate directly or indirectly with various nodes of a core network (e.g., Evolved Packet Core (EPC), . . . ) in system 600. For instance, the nodes of the core network can include a Packet Data Network Gateway (PGW) 604, a Serving Gateway (SGW) 606, a Mobility Management Entity (MME) 608, and a Home Subscriber Server (HSS) 610. Although not shown, it is contemplated that system 600 can include more than one PGW 604, SGW 606, MME 608, and/or HSS 610.

PGW 604 can interface with external Packet Data Network(s) (PDN(s)) such as, for instance, the Internet 612 and/or an IP multimedia subsystem (IMS) 614. Moreover, although not depicted, PGW 604 can additionally or alternatively interface with an Intranet or any disparate PDN(s). PGW 604, for example, can handle address allocation, policy enforcement, packet classification and routing, and so forth.

SGW 606 is associated with a user plane and is an anchor point for mobility. SGW 606 points to a serving base station (e.g., HeNB 602, disparate HeNB, differing eNB, . . . ) of a user (e.g., employing a mobile device 616, . . . ). Thus, upon handing off to a differing base station, SGW 606 can repoint to the differing base station. Further, SGW 606 can enable data to be routed to the appropriate base station (e.g., HeNB 602, . . . ) serving mobile device 616 at a given time.

MME 608 is associated with a control plane. MME 608 can support control plane signaling for mobility, Quality of Service (QoS) initialization, user authentication, and the like. Further, HSS 610 can store various subscription information such as, for instance, phone numbers, profiles, and the like.

System 600 includes various interfaces between nodes. For instance, an S6a interface can connect MME 608 and HSS 610 and an S5/S8 interface can connect SGW 606 and PGW 604. Further, an S1-U interface can connect HeNB 602 and SGW 606, an S11 interface can couple SGW 606 and MME 608, and an S1-MME interface can connect HeNB 602 and MME 608. Additionally, PGW 604 can connect to PDN(s) (e.g., Internet 612, IMS 614, . . . ) via respective SGi interfaces, and HeNB 602 and mobile device 616 can be coupled via an E-UTRA-Uu interface. Moreover, MME 608 can be associated with an S10 interface.

HSS 610 can also directly or indirectly connect to CSG provisioning network elements, namely a CSG administration server 618 and a CSG list server 620. CSG administration server 618 can support CSG administration functions, which can be utilized to manage a list of subscribers for a CSG (e.g., access control list for the CSG, . . . ). For example, an owner of HeNB 602 can interact with CSG administration server 618 via an interface (e.g., Graphical User Interface (GUI), website, . . . ) to add or remove a user from being included in a CSG associated with HeNB 602. Based upon such changes, CSG administration server 618 can update HSS 610 to adjust subscription information for the user as modified.

Further, CSG list server 620 provides UE CSG provisioning functionality utilized to manage an allowed CSG list (e.g., whitelist (WL), . . . ) for mobile device 616 (and/or any disparate mobile device(s) (not shown)). CSG list server 620 can inform mobile device 616 that it is a member of a particular group (e.g., particular CSG, . . . ). Further, when a subscription is updated by CSG administration server 618, HSS 610 can store subscription information corresponding to the update. Moreover, updating the subscription information in HSS 610 can trigger a message to be transferred to CSG list server 620, which can cause CSG list server 620 to utilize an Open Mobile Alliance Device Management (OMA-DM) process to downlink the modified subscription information to mobile device 616. Hence, CSG list server 620 can enable synchronizing the subscription information retained by HSS 610 and mobile device 616 (e.g., stored in memory of mobile device 616, retained on a Subscriber Identity Module (SIM) or a Universal SIM (USIM) associated with mobile device 616, . . . ).

Various logical network protocol functions between mobile device 616 and core network elements can be effectuated in system 600 to support CSG. The logical network protocol functions, for instance, can include UE CSG provisioning functions, access control functions, mobility management functions, and CSG administration functions.

UE CSG provisioning functions can manage the allowed CSG list for mobile device 616. The allowed CSG list is a list of CSG IDs; mobile device 616 is able to access CSG cells that have a CSG ID included in the allowed CSG list. The allowed CSG list can be stored in the network in order to perform access control and stored by mobile device 616 to enable selecting a cell to be accessed. The allowed CSG list in the network can be permanently stored in HSS 610, and retrieved by MME 608 for access control during attach, detach, service request, and tracking area updating procedures. The allowed CSG list at mobile device 616 can be stored on a USIM for such mobile device 616 or memory of mobile device 616.

Access control functions can ensure that a mobile device has a valid subscription at a CSG where it performs an access. MME 608 can perform access control for mobile device 616 accessing the network through an CSG cell during attach, detach, service request, and tracking area updating procedures. Further, MME 608 can include a reject cause value in a Non-Access Stratum (NAS) signaling response upon recognizing that mobile device 616 is not allowed in the CSG for attach, service request, and/or tracking area updating procedures.

Further, mobility management functions can be used to keep track of a current location of mobile device 616. The location of mobile device 616 in idle state can be known by the network on a Tracking Area list granularity. Thus, when in idle state, mobile device 616 can be paged in all cells of the Tracking Area list received at a last Tracking Area Update.

Moreover, CSG administration functions can manage the list of subscribers for a CSG. The CSG administration function can be hosted by an operator or a third party. For instance, a single list can control the HeNBs for a CSG. Further, HeNBs advertising the same CSG ID can have a single list of subscribers.

As noted above, HSS 610 can permanently retain CSG subscription information. Further, the CSG subscription information can be retrieved by MME 608 during an attach procedure or tracking area updating procedure as part of a subscription profile of mobile device 616. MME 608 can utilize the retrieved CSG subscription information to perform access control. For instance, MME 608 can perform access control since access control is a NAS level procedure, and MME 608 is the NAS endpoint in the core network. Further, MME 608 can obtain and store a copy of an allowed CSG list for mobile device 616 (e.g., the allowed CSG list can be retained as part of the user's subscription information, . . . ). Moreover, MME 608 can know a CSG ID of a CSG cell where mobile device 616 is performing the access in order to effectuate access control.

Although described herein as being performed at the NAS, it is contemplated that access control for CSGs can be implemented at an Access Stratum (AS). Access control at the AS can be implemented in a Radio Network Controller (RNC) function in HeNB 602 (or in a related function in an HeNB-Gateway (not shown)). It is to be appreciated, however, that the claimed subject matter is not so limited.

Additional examples related to CSG utilization in general are set forth below. It is contemplated that these examples are presented for illustration purposes, and the claimed subject matter is not limited by these examples.

According to an example, cell selection/reselection to CSG cells need not require the network to provide neighbor cell information to a mobile device. Neighbor cell information can be provided to help a mobile device in specific cases such as, for instance, where the network attempts to trigger the mobile device to search for CSG cells. Thus, CSG base stations can be excluded from being advertised in neighbor lists of other base stations. The mobile device can be expected to independently measure attributes of the serving and neighboring cells. Further, for inter-frequency neighboring cells, carrier frequencies can be indicated. Moreover, an open base station can be advertised in a CSG base station neighbor list. It can be useful for a mobile device to know neighboring base stations for registration if the mobile device provides a Tracking Area Identifier (TAI) list when it registers. A TAI can be a paging and registration equivalent to a Location Area Identifier (LAI), many cells can have the same TAI, and cells with the same TAI can page a mobile device (e.g., base stations with the same TAI can be managed by the same group of MMEs, . . . ). Further, during Automatic Neighbor Relationship (ANR), a determination can be effectuated to identify whether a neighbor is restricted, hybrid, or open, as well as whether it is part of a common CSG.

Moreover, cells can be associated with Physical Cell Identifiers (PCIDs). PCID reuse can be collision free and confusion free. Collision free can refer to the PCID being unique in an area that a cell covers, while confusion free can refer to a cell not having two or more neighboring cells with the same PCID. To provide for the foregoing, the PCID space can be partitioned (e.g., not necessarily equally). In particular, overlay (e.g. macro network, . . . ) and underlay (e.g. femto network, pico network, . . . ) base stations can have different PCID spaces. The underlay base station that chooses a bad PCID can less adversely affect overlay base stations. Further, partition sizes can vary by geographic region (e.g., urban versus rural, . . . ) or be specified. Moreover, mobile devices need not be aware of partitions unless they are used to optimize handoffs.

By way of another example related to cell reselection, a base station can indicate restricted association in SIB1. Following this example, a CSG ID and a CSG indication can be included in SIB1. SIB1 can further include the PLMN, which can be read for cell selection. Utilization of the foregoing can allow a mobile device to identify whether a base station is restricted, hybrid or open, and whether the base station is suitable for the mobile device. Further, the mobile device can confirm that the CSG ID of a CSG base station is in an allowed CSG list before effectuating idle state handoff (e.g., mobile device can register at the CSG base station if necessary, . . . ). Moreover, idle state hand-out procedures (e.g., CSG base station to open base station, . . . ) can be similar to procedures employed for transitioning from open base station to open base station.

A further example relates to connected state procedures. A base station can indicate restricted association in SIB1 by using a CSG ID and a CSG indication. Conventionally, SIB1 may not be heard until after access; yet, failed access attempts at CSG cells can be mitigated by a mobile device reviewing SIB1. The mobile device can confirm that a CSG ID of a CSG base station is in an allowed CSG list before access. The mobile device can confirm the CSG ID using measurement gaps to hear before a handover command or before access after the handover command. Moreover, connected state hand-out procedures (e.g., CSG base station to open base station, can be similar to open base station to open base station procedures.

A CSG base station can be associated with various characteristics. For instance, a CSG base station can be deployed on a single frequency or multiple frequencies (e.g., CSG base station/hybrid base station/open base station frequencies can overlap, . . . ). Further, a CSG base station can broadcast sufficient information so that a mobile device can determine that it is a CSG base station, and whether it is a home, guest, or alien base station without access the CSG base station. Moreover, a CSG base station can determine whether a mobile device is a home, guest, or alien mobile device when it attempts access. The CSG base station can support guest mobile device usage, can allow a mobile device to access for emergency services, and alien mobile devices can be rejected in a manner that can cause them not to try to access again. Moreover, a mobile device can determine whether a CSG base station is a home, guest, or alien base station without performing an access. The mobile device can be provisioned with a list of allowed home and guest base stations. The mobile device may not be required to distinguish between a home and guest base station. Further, the mobile device typically should not try to access an alien base station (e.g. other than emergency services, . . . ). Moreover, the mobile device commonly should not camp on the alien base station while in idle state (e.g., unless the alien base station is allowed to page the mobile device, . . . ). The mobile device can have a list of home and guest base stations, which can be independent of PLMN identities.

A CSG base station can support varying types of association. For instance, full association can be provided for home or guest mobile devices at a CSG base station. Such mobile devices with full association can camp on and be paged in idle state and can set up a call/session from the CSG base station (e.g. attach, . . . ). Further, for an alien mobile device at a CSG base station, signaling association or restricted association can be supported. Signaling association (e.g., semi-open, . . . ) can allow a mobile device to camp on and be paged in idle state (e.g., but not access, . . . ) and/or access the alien base station for NAS and/or Radio Resource Control (RRC) control plane signaling (e.g., manage interference in order to access another base station, . . . ). Further, with restricted association, a mobile device typically does not access the alien base station and typically does not camp on such base station in idle state.

Figure 7:
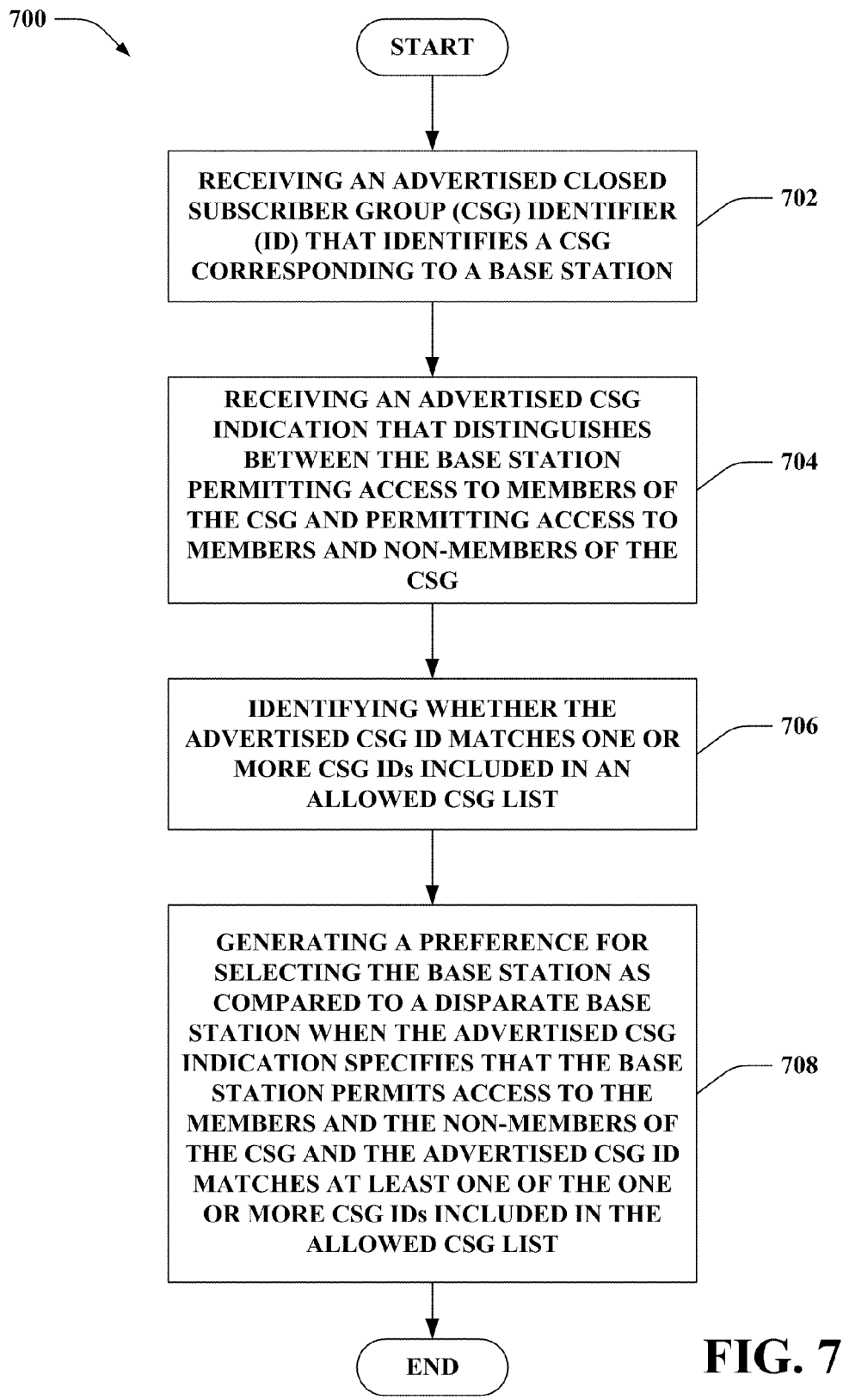
FIG. 7 is an illustration of an example methodology that facilitates employing advertised Closed Subscriber Group (CSG) related information in a wireless communication environment.
Figure 8:
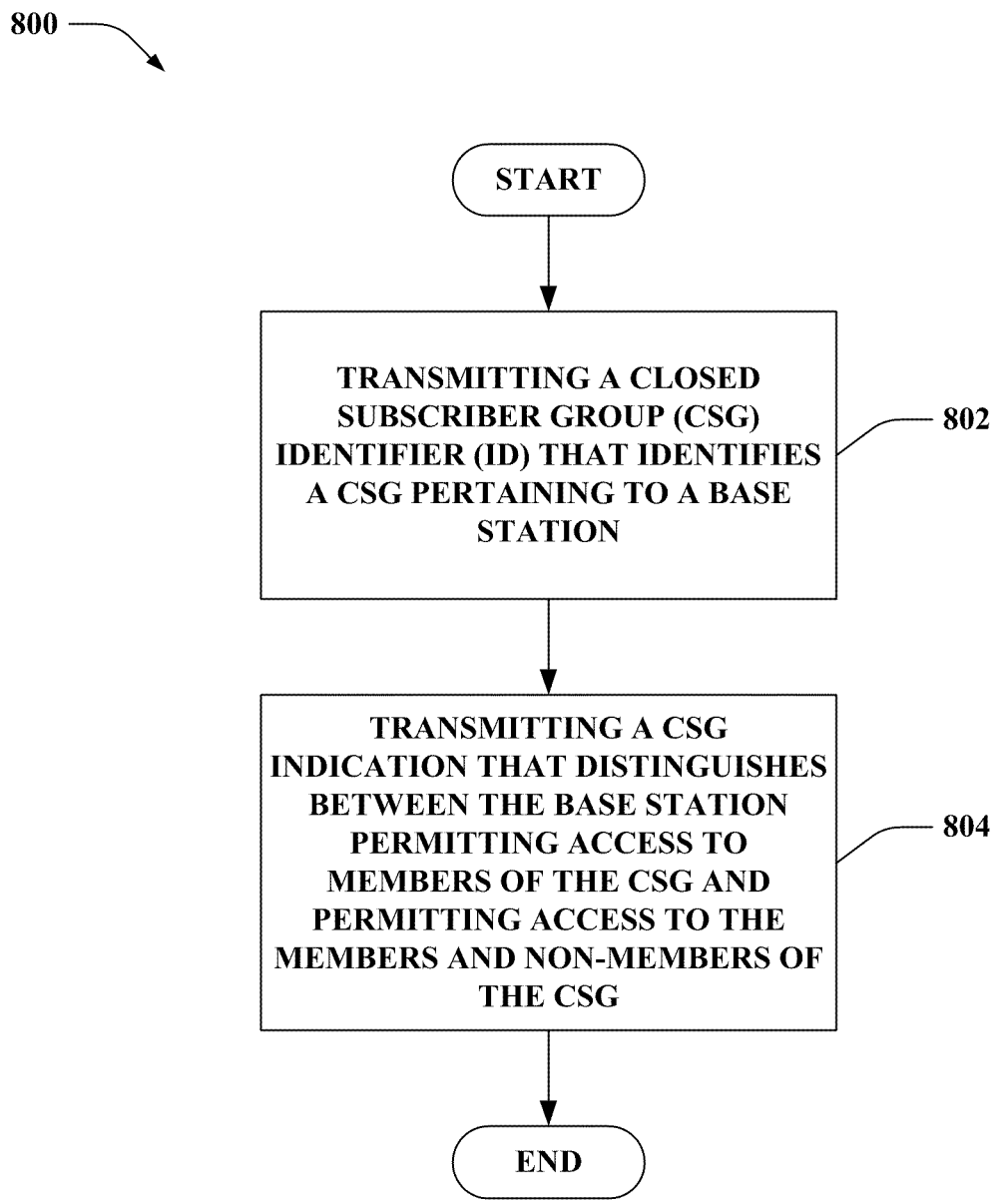
FIG. 8 is an illustration of an example methodology that facilitates advertising Closed Subscriber Group (CSG) related information in a wireless communication environment.

Referring to FIGS. 7-8, methodologies relating to advertising and/or employing Closed Subscriber Group (CSG) related information in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 7, illustrated is a methodology 700 that facilitates employing advertised Closed Subscriber Group (CSG) related information in a wireless communication environment. At 702, an advertised Closed Subscriber Group (CSG) Identifier (ID) that identifies a CSG corresponding to a base station can be received. The CSG ID, for instance, can uniquely identify the CSG corresponding to the base station. By way of further example, the CSG ID can uniquely identify the CSG corresponding to the base station in an operator network. At 704, an advertised CSG indication that distinguishes between the base station permitting access to members of the CSG and permitting access to members and non-members of the CSG can be received. According to an illustration, the advertised CSG indication can signify that the base station is associated with a CSG cell, which restricts services to only members of the CSG, when the base station is identified to permit access to the members of the CSG. Further, the advertised CSG indication can signify that the base station is associated with a hybrid cell, which permits services to both members and non-members of the CSG, when the base station is recognized to permit access to the members and the non-members of the CSG. Moreover, a hybrid cell can provide higher Quality of Service (QoS) to the members compared to the non-members. According to another example, the base station can be differentiated from a macro cell base station (e.g., Evolved Node B, Node B, . . . ), where the base station is one of a Home Evolved Node B (HeNB) or a Home Node B (HNB).

At 706, an identification can be effectuated as to whether the advertised CSG ID matches one or more CSG IDs included in an allowed CSG list. At 708, a preference for selecting the base station as compared to a disparate base station can be generated when the advertised CSG indication specifies that the base station permits access to the members and the non-members of the CSG and the advertised CSG ID matches at least one of the one or more CSG IDs included in the allowed CSG list. By way of further example, the preference for selecting the base station as opposed to a differing base station can be generated when the advertised CSG indication specifies that the base station permits access to the members of the CSG and the advertised CSG ID matches at least one of the one or more CSG IDs included in the allowed CSG list. Following this example, the differing base station can be associated with a differing CSG indication which identifies that the differing base station permits access to the members and the non-members of the CSG. In accordance with another illustration, the preference for selecting the base station can be generated as a function of a billing model. For instance, the billing model can provide different billing levels to the members of the CSG versus the non-members of the CSG.

Further, the preference for selecting the base station can be utilized to camp on the base station for idle mode, register with the base station, access the base station, and the like. According to an example, the base station can be automatically selected for access based at least in part upon the preference. Alternatively, the base station can be manually selected for access based upon user input in response to a displayed ranking of detected base stations. For instance, the displayed ranking of detected base stations can include an indication of whether the base station permits access to the members of the CSG or permits access to the members and the non-members of the CSG.

Moreover, cell selection priority can be managed based upon an ordering of the one or more CSG IDs included in the allowed CSG list. By way of example, the one or more CSG IDs included in the allowed CSG list can be controlled by an operator. In accordance with another example, the one or more CSG IDs included in the allowed CSG list can be controlled by an operator and/or a user; thus, a CSG ID can be added to the allowed CSG list and/or a CSG ID can be removed from the CSG list.

Now referring to FIG. 8, illustrated is a methodology 800 that facilitates advertising Closed Subscriber Group (CSG) related information in a wireless communication environment. At 802, a Closed Subscriber Group (CSG) Identifier (ID) that identifies a CSG pertaining to a base station can be transmitted. For instance, the CSG ID can uniquely identify the CSG pertaining to the base station. By way of another example, the CSG ID can uniquely identify the CSG pertaining to the base station in an operator network. At 804, a CSG indication that distinguishes between the base station permitting access to members of the CSG and permitting access to the members and non-members of the CSG can be transmitted. The CSG ID and the CSG indication can be sent over the downlink. By way of example, the CSG ID and the CSG indication can be included in a system information block type 1 message (SIB1); however, it is to be appreciated that the claimed subject matter is not so limited. Further, the CSG indication can signify that the base station is associated with one of a CSG cell or a hybrid cell. Moreover, a CSG cell can restrict services to only members of the CSG and a hybrid cell can permit services to both the members and the non-members of the CSG. According to an example, a hybrid cell can provide preferred Quality of Service (QoS) to the members versus the non-members of the CSG upon receiving an access from a mobile device. Additionally or alternatively, a hybrid cell can support different billing levels for the members versus the non-members of the CSG upon receiving an access from a mobile device. In accordance with another aspect, an indication that distinguishes the base station from a macro Node B or Evolved Node B can be broadcasted (e.g., if the base station is a Home Evolved Node B (HeNB) or a Home Node B (HNB), . . . ). Pursuant to another example, the base station can switch between CSG operation and hybrid operation. Further, a mobile device can be identified as being a member or a non-member of the CSG when providing services to the mobile device.

It will be appreciated that, in accordance with one or more aspects described herein, inferences can be made regarding distributing and/or utilizing CSG related information in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
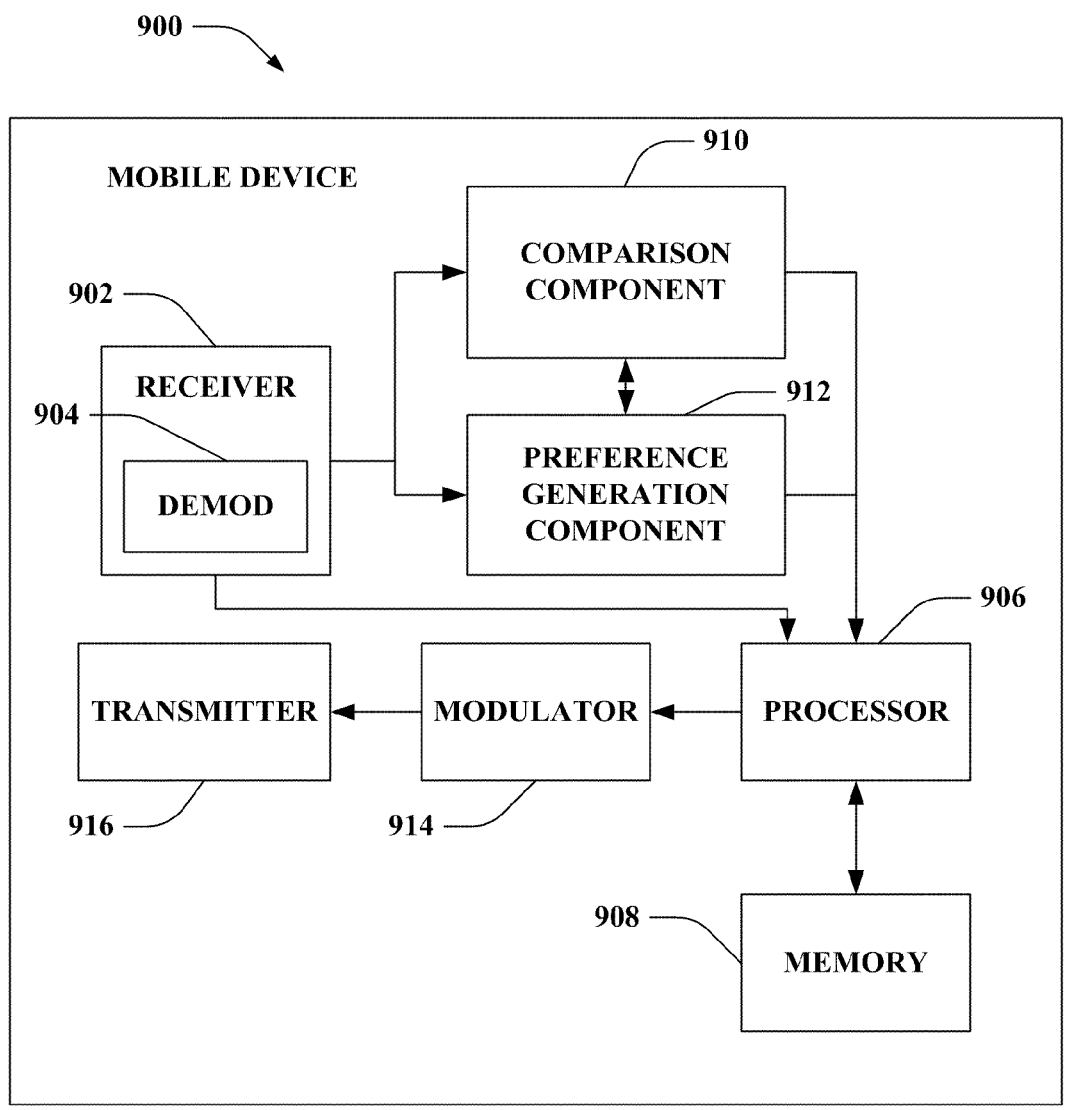
FIG. 9 is an illustration of an example mobile device that utilizes Closed Subscriber Group (CSG) Identifiers (IDs) and CSG indications for selecting to access a base station in a wireless communication system.

FIG. 9 is an illustration of a mobile device 900 that utilizes Closed Subscriber Group (CSG) Identifiers (IDs) and CSG indications for selecting to access a base station in a wireless communication system. Mobile device 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. According to an example, receiver 902 (e.g., receiving component 212 of FIG. 2, . . . ) can obtain an advertised CSG ID that identifies a CSG corresponding to a base station and an advertised CSG indication that differentiates between the base station being a CSG base station and a hybrid base station. Processor 906 can be a processor dedicated to analyzing information received by receiver 902 and/or generating information for transmission by a transmitter 916, a processor that controls one or more components of mobile device 900, and/or a processor that both analyzes information received by receiver 902, generates information for transmission by transmitter 916, and controls one or more components of mobile device 900.

Mobile device 900 can additionally comprise memory 908 that is operatively coupled to processor 906 and that can store data to be transmitted, received data, and any other suitable information related to performing the various actions and functions set forth herein. Memory 908, for instance, can store protocols and/or algorithms associated with analyzing obtained CSG IDs and CSG indications. Further, memory 908 can store protocols and/or algorithms associated with generating selection preferences related to base stations as a function of the analysis of the obtained CSG IDs and CSG indications. Memory 908 can also include an allowed CSG list (e.g., allowed CSG list 218 of FIG. 2, . . . ).

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 906 can be operatively coupled to a comparison component 910 and/or a preference generation component 912. Comparison component 910 can be substantially similar to comparison component 214 of FIG. 2 and/or preference generation component 912 can be substantially similar to preference generation component 216 of FIG. 2. Comparison component 910 can evaluate whether obtained CSG IDs match CSG IDs included in an allowed CSG list (e.g., retained in memory 908, . . . ). When an obtained CSG ID matches a CSG ID from the allowed CSG list, comparison component 910 can recognize that mobile device 900 is a member of a CSG corresponding to the obtained CSG ID. Further, when an obtained CSG ID lacks a match in the allowed CSG list, comparison component 910 can identify that mobile device 900 is a non-member of a CSG corresponding to the obtained CSG ID. Moreover, preference generation component 912 can yield a preference for choosing a first base station as opposed to other base station(s) as a function of the obtained CSG IDs and CSG indications. Mobile device 900 still further comprises a modulator 914 and a transmitter 916 that transmits data, signals, etc. to a base station. Although depicted as being separate from the processor 906, it is to be appreciated that comparison component 910, preference generation component 912 and/or modulator 914 can be part of processor 906 or a number of processors (not shown).

Figure 10:
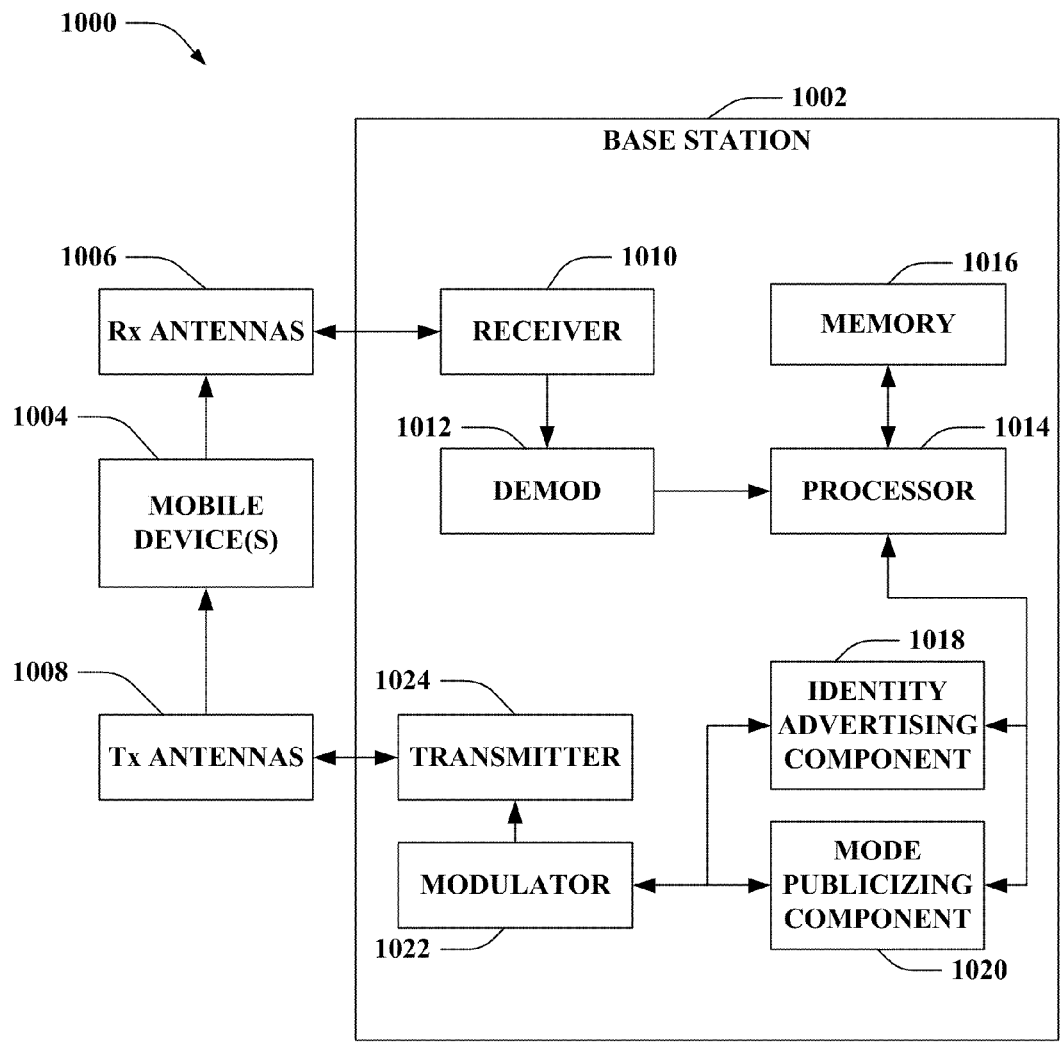
FIG. 10 is an illustration of an example system that advertises a Closed Subscriber Group (CSG) Identifier (ID) and a CSG indication in a wireless communication environment.

FIG. 10 is an illustration of a system 1000 that advertises a Closed Subscriber Group (CSG) Identifier (ID) and a CSG indication in a wireless communication environment. System 1000 comprises a base station 1002 (e.g., access point, . . . ) with a receiver 1010 that receives signal(s) from one or more mobile devices 1004 through a plurality of receive antennas 1006, and a transmitter 1024 that transmits to the one or more mobile devices 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores data to be transmitted to or received from mobile device(s) 1004 and/or any other suitable information related to performing the various actions and functions set forth herein. Processor 1014 is further coupled to an identity advertising component 1018 and/or a mode publicizing component 1020. Identity advertising component 1018 can be substantially similar to identity advertising component 208 of FIG. 2 and/or mode publicizing component 1020 can be substantially similar to mode publicizing component 210 of FIG. 2. Identity advertising component 1018 can yield and/or send a CSG ID that identifies a CSG corresponding to base station 1002 over a downlink. Further, mode publicizing component 1020 can generate and/or transmit a CSG indication over the downlink, where the CSG indication can distinguish between base station 1002 being a CSG base station and a hybrid base station. Moreover, although not shown, it is to be appreciated that base station 1002 can further include a mode transition component, which can be substantially similar to mode transition component 304 of FIG. 3. Base station 1002 can further include a modulator 1022. Modulator 1022 can multiplex a frame for transmission by a transmitter 1024 through antennas 1008 to mobile device(s) 1004 in accordance with the aforementioned description. Although depicted as being separate from the processor 1014, it is to be appreciated that identity advertising component 1018, mode publicizing component 1020, and/or modulator 1022 can be part of processor 1014 or a number of processors (not shown).

Figure 11:
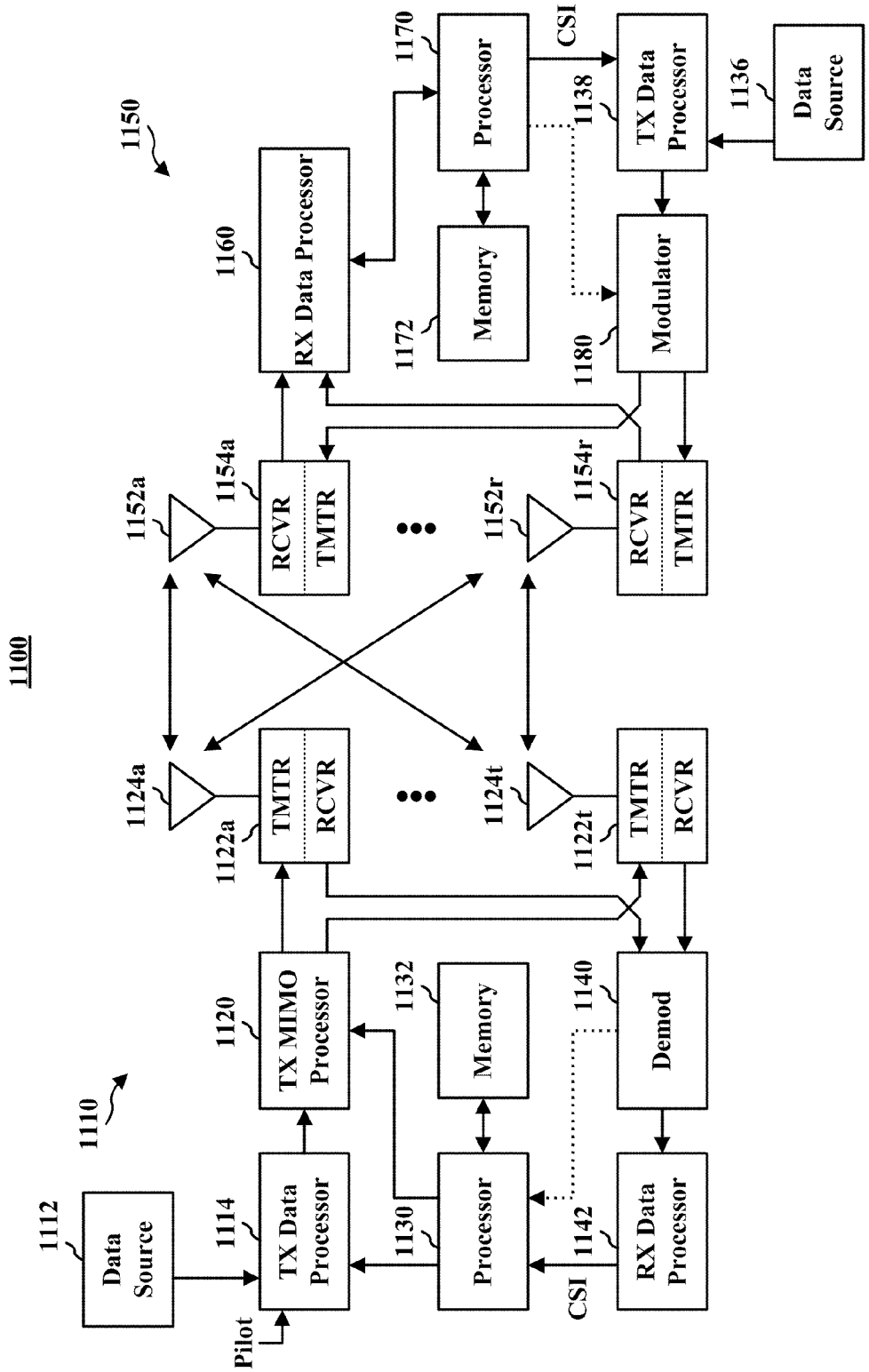
FIG. 11 is an illustration of an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3, 5-6, 9-10 and 12-13) and/or methods (FIGS. 7-8) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which preceding matrix to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which preceding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
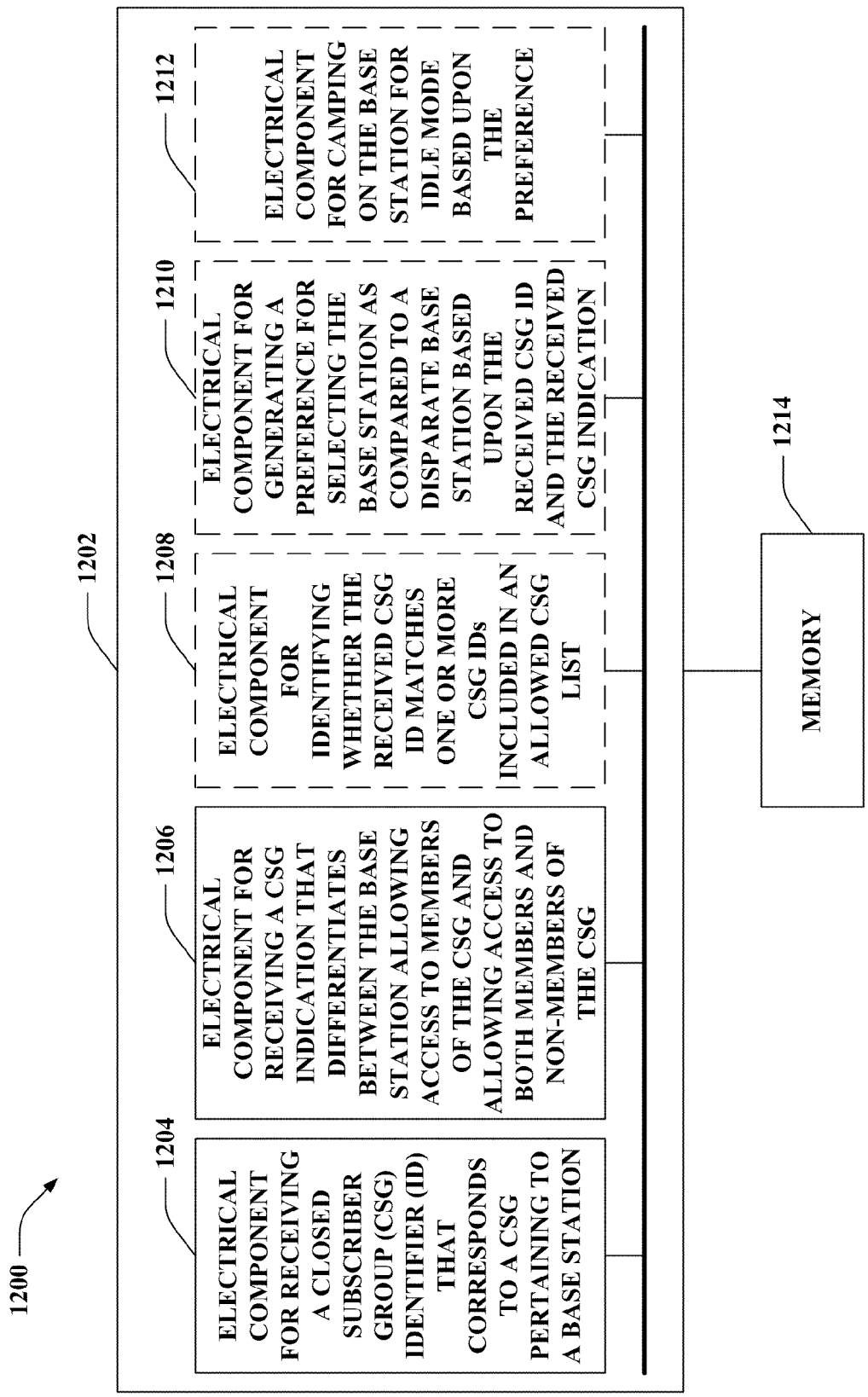
FIG. 12 is an illustration of an example system that enables utilizing Closed Subscriber Group (CSG) related information in a wireless communication environment.

With reference to FIG. 12, illustrated is a system 1200 that enables utilizing Closed Subscriber Group (CSG) related information in a wireless communication environment. For example, system 1200 can reside within a mobile device. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving a Closed Subscriber Group (CSG) Identifier (ID) that corresponds to a CSG pertaining to a base station 1204. Moreover, logical grouping 1202 can comprise an electrical component for receiving a CSG indication that differentiates between the base station allowing access to members of the CSG and allowing access to both members and non-members of the CSG 1206. Further, logical grouping 1202 can optionally include an electrical component for identifying whether the received CSG ID matches one or more CSG IDs included in an allowed CSG list 1208. Logical grouping 1202 can also optionally include an electrical component for generating a preference for selecting the base station as compared to a disparate base station based upon the received CSG ID and the received CSG indication 1210. Moreover, logical grouping 1202 can optionally include an electrical component for camping on the base station for idle mode based upon the preference 1212. Additionally, system 1200 can include a memory 1214 that retains instructions for executing functions associated with electrical components 1204, 1206, 1208, 1210, and 1212. While shown as being external to memory 1214, it is to be understood that one or more of electrical components 1204, 1206, 1208, 1210, and 1212 can exist within memory 1214.

Figure 13:
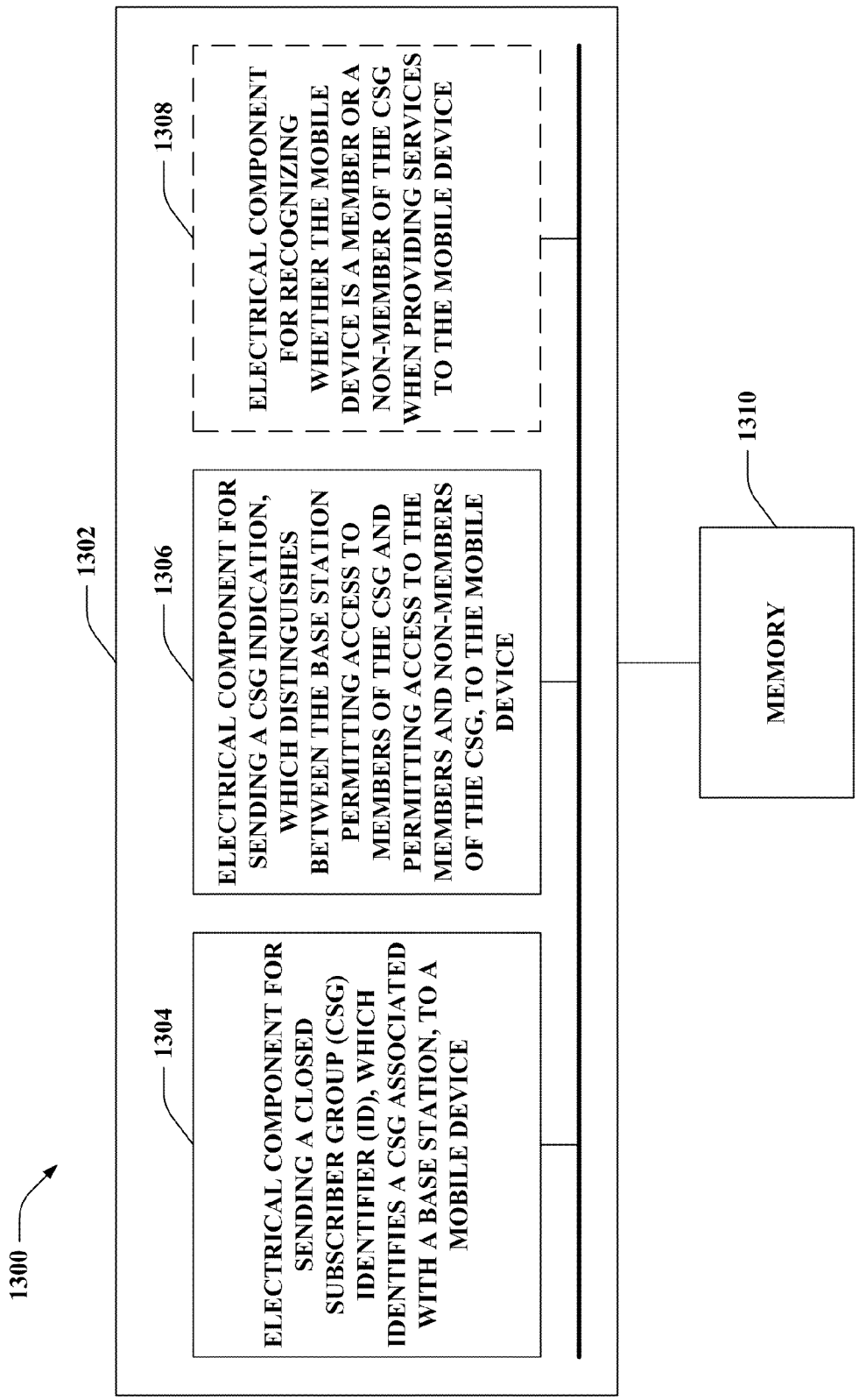
FIG. 13 is an illustration of an example system that enables advertising CSG related information in a wireless communication environment.

With reference to FIG. 13, illustrated is a system 1300 that enables advertising CSG related information in a wireless communication environment. For example, system 1300 can reside at least partially within a base station. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for sending a Closed Subscriber Group (CSG) Identifier (ID), which identifies a CSG associated with a base station, to a mobile device 1304. Moreover, logical grouping 1302 can include an electrical component for sending a CSG indication, which distinguishes between the base station permitting access to members of the CSG and permitting access to the members and non-members of the CSG, to the mobile device 1306. Logical grouping 1302 can also optionally include an electrical component for recognizing whether the mobile device is a member or a non-member of the CSG when providing services to the mobile device 1308. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
   receiving, by at least one mobile device, an advertised Closed Subscriber Group (CSG) Identifier (ID) that identifies a CSG corresponding to a base station broadcast by a base station;
   receiving, by the at least one mobile device, an advertised CSG indication that distinguishes between the base station permitting access to members of the CSG and permitting access to the members and non-members of the CSG broadcast by a base station;
   identifying whether the advertised CSG ID matches one or more CSG IDs included in an allowed CSG list, stored in a memory of the at least one mobile device; and
   generating a preference for selecting the base station as compared to a disparate base station when the advertised CSG indication specifies that the base station permits access to the members and the non-members of the CSG and the advertised CSG ID matches at least one of the one or more CSG IDs included in the allowed CSG list.

2. The method of claim 1, wherein the advertised CSG ID uniquely identifies the CSG corresponding to the base station.

3. The method of claim 1, wherein the advertised CSG indication signifies that the base station is associated with a CSG cell, which restricts services to only the members of the CSG, when the base station is identified to permit access to the members of the CSG.

4. The method of claim 1, wherein the advertised CSG indication signifies that the base station is associated with a hybrid cell, comprising a base station that advertises the CSG IDs and permits services to both the members and the non-members of the CSG, when the base station is recognized to permit access to the members and the non-members of the CSG.

5. The method of claim 4, wherein the hybrid cell provides higher Quality of Service (QoS) to the members compared to the non-members.

6. The method of claim 1, wherein the advertised CSG indication specifies that the base station permits access is limited to the members of the CSG and the advertised CSG ID matches at least one of the one or more CSG IDs included in the allowed CSG list.

7. The method of claim 6, wherein the differing base station is associated with a differing CSG indication which identifies that the differing base station permits access to the members and the non-members of the CSG.

8. The method of claim 1, further comprising differentiating the base station from a macro cell base station, wherein the base station is one of a Home Evolved Node B (HeNB) or a Home Node B (HNB).

9. The method of claim 1, wherein allowed CSG list comprises a changeable stored list.

10. The method of claim 1, further comprising at least one of:
adding a CSG ID to the allowed CSG list; or
removing a CSG ID from the allowed CSG list.

11. The method of claim 1, further comprising selecting to access the base station automatically based at least in part upon the preference.

12. The method of claim 1, further comprising selecting to access the base station based upon user input in response to a displayed ranking of detected base stations.

13. The method of claim 12, wherein the displayed ranking of detected base stations includes an indication of whether the base station one of permits access to the members of the CSG or permits access to the members and the non-members of the CSG.

14. The method of claim 1, further comprising utilizing the preference for selecting the base station to at least one of camp on the base station for idle mode, register with the base station, or access the base station.

15. A wireless communications apparatus, comprising:
at least one processor configured to:
compare a received Closed Subscriber Group (CSG) Identifier (ID), the received CSG ID transmitted by a base station, which identifies a CSG associated with the base station, to one or more CSG IDs included in an allowed CSG list stored in a memory of at least one mobile device, to recognize existence of a match between the received CSG ID and the CSG IDs in the allowed CSG list; and
generate a preference for selecting the base station as compared to a disparate base station when a received CSG indication signifies that the base station permits services to both members and non-members of the CSG and the received CSG ID matches at least one of the one or more CSG IDs included in the allowed CSG list.

16. The wireless communications apparatus of claim 15, wherein the received CSG ID uniquely identifies the CSG associated with the base station.

17. The wireless communications apparatus of claim 15 wherein the received CSG indication signifies that the base station restricts services to only the members of the CSG and the received CSG ID matches at least one of the one or more CSG IDs included in the allowed CSG list.

18. The wireless communications apparatus of claim 17, wherein a differing base station is associated with a differing CSG indication which identifies that the differing base station permits services to both the members and the non-members of the CSG.

19. The wireless communications apparatus of claim 15, further comprising:
at least one processor configured to:
distinguish the base station from a macro cell base station, wherein the base station is one of a Home Evolved Node B (HeNB) or a Home Node B (HNB).

20. The wireless communications apparatus of claim 15, further comprising:
at least one processor configured to:
employ the preference for selecting the base station to at least one of camp on the base station for idle mode, register with the base station, or access the base station.

21. A computer program product, comprising:
a non-transitory computer-readable medium comprising:
code for causing at least one computer to receive an advertised Closed Subscriber Group (CSG) Identifier (ID) that identifies a CSG corresponding to a base station;
code for causing at least one computer to receive an advertised CSG indication that distinguishes between the base station permitting access to members of the CSG and permitting access to the members and non-members of the CSG;
code for causing at least one computer to identify whether the advertised CSG ID matches one or more CSG IDs included in an allowed CSG list, stored in a memory of the at least one computer; and
code for causing at least one computer to generate a preference for selecting the base station as compared to a disparate base station when the advertised CSG indication specifies that the base station permits access to the members and the non-members of the CSG and the advertised CSG ID matches at least one of the one or more CSG IDs included in the allowed CSG list.

22. The computer program product of claim 21, wherein the advertised CSG ID uniquely identifies the CSG corresponding to the base station.

23. The computer program product of claim 21, wherein the advertised CSG indication specifies that the base station permits access to only the members of the CSG and the advertised CSG ID matches at least one of the one or more CSG IDs included in the allowed CSG list.

24. The computer program product of claim 23, wherein a differing base station is associated with a differing CSG indication which identifies that the differing base station permits access to the members and non-members of a differing CSG associated with a differing CSG ID.

25. An apparatus, comprising:
a receiving component that obtains an advertised Closed Subscriber Group (CSG) Identifier (ID) that identifies a CSG corresponding to a base station and an advertised CSG indication that differentiates between the base station permitting access to members of the CSG and permitting access to the members and non-members of the CSG;

a comparison component that evaluates whether the advertised CSG ID matches a CSG ID included in an allowed CSG list, stored in a memory of at least one mobile device; and a preference generation component that generates a preference for selecting the base station as compared to a disparate base station when the advertised CSG indication specifies that the base station permits access to the members and the non-members of the CSG and the advertised CSG ID of the base station matches the CSG ID included in the allowed CSG list.

26. The apparatus of claim 25, wherein the advertised CSG indication specifies that the base station permits access to only the members of the CSG and the advertised CSG ID matches the CSG ID included in the allowed CSG list.

* * * * *